(12) United States Patent
Zillig et al.

(10) Patent No.: US 8,978,992 B2
(45) Date of Patent: Mar. 17, 2015

(54) COOLER BYPASS APPARATUS AND INSTALLATION KIT

(75) Inventors: Steve Zillig, Clarence, NY (US); Robert Howard Stoll, Middleport, NY (US); Joseph Anthony Giarrizzo, Amherst, NY (US); Michael Jonas, Clarence, NY (US); Arthur J. Murray, Medina, NY (US)

(73) Assignee: Jiffy-Tite Company, Inc., Lancaster, NY (US)

( * ) Notice: Subject to any disclaimer, the term of this patent is extended or adjusted under 35 U.S.C. 154(b) by 1176 days.

(21) Appl. No.: 12/881,576

(22) Filed: Sep. 14, 2010

(65) Prior Publication Data

US 2011/0061744 A1 Mar. 17, 2011

Related U.S. Application Data

(60) Provisional application No. 61/242,148, filed on Sep. 14, 2009, provisional application No. 61/305,226, filed on Feb. 17, 2010.

(51) Int. Cl.
| | |
|---|---|
| *F01P 7/02* | (2006.01) |
| *G05D 23/13* | (2006.01) |
| *G05D 23/12* | (2006.01) |
| *F16K 17/38* | (2006.01) |

(Continued)

(52) U.S. Cl.
CPC .............. *F16K 31/002* (2013.01); *F15B 21/042* (2013.01); *F16K 11/22* (2013.01); *F16H 57/0413* (2013.01); *F16H 57/0417* (2013.01)
USPC ....... 236/34.5; 236/93 R; 236/93 A; 137/468; 137/625.49

(58) Field of Classification Search
USPC ........ 235/34.5, 93 R, 93 A; 137/468, 625.49; 236/34.5, 93 R, 93 A
See application file for complete search history.

(56) References Cited

U.S. PATENT DOCUMENTS

| | | | |
|---|---|---|---|
| 1,957,498 | A | 5/1934 | Hamill |
| 2,396,053 | A | 3/1946 | McEntire |

(Continued)

FOREIGN PATENT DOCUMENTS

JP 2000045773 2/2000

OTHER PUBLICATIONS

European Search Report for Application No. /Patent No. 08826434.6-2206/2165050/PCT/US2008070179 dated Feb. 15, 2011.

*Primary Examiner* — Alexandra Elve
*Assistant Examiner* — Henry Crenshaw
(74) *Attorney, Agent, or Firm* — Young Basile Hanlon & MacFarlane, P.C.

(57) ABSTRACT

A cooler bypass valve apparatus installed the apparatus between a heat exchanger and conduits coupled to a device carrying fluid that needs to be cooled. A housing includes an inlet port and first and second outlet ports. At least one thermal actuator and at least one valve are mounted in a fluid flow passageway in the housing and operative in response to the fluid temperature to move the at least one valve between operative positions opening and closing fluid flow from the inlet port through the first and second outlet ports between a heat exchanger bypass loop and a heat exchanger cooling loop. In another aspect, two thermal actuators control a separate valve associated with the first and second outlets between open and closed positions enabling fluid flow from the inlet port exclusively through one of the first and second outlet ports or in a combined partial flow through both of the first and second outlet ports.

7 Claims, 20 Drawing Sheets

(51) Int. Cl.
*F16K 11/02* (2006.01)
*F16K 31/00* (2006.01)
*F15B 21/04* (2006.01)
*F16K 11/22* (2006.01)
*F16H 57/04* (2010.01)

(56) References Cited

U.S. PATENT DOCUMENTS

| | | |
|---|---|---|
| 2,512,800 A | 6/1950 | Jensen |
| 3,440,833 A | 4/1969 | Fernandes |
| 3,931,831 A | 1/1976 | French |
| 3,949,777 A | 4/1976 | Caldwell |
| 4,538,679 A | 9/1985 | Hoskins et al. |
| 4,640,534 A | 2/1987 | Hoskins et al. |
| 4,846,219 A | 7/1989 | Schaefer |
| 5,048,751 A | 9/1991 | DuBois |
| 5,228,618 A | 7/1993 | Afshar |
| 5,347,825 A | 9/1994 | Krist |
| 5,572,396 A | 11/1996 | Robinson |
| 5,586,449 A | 12/1996 | Krist |
| 5,642,691 A | 7/1997 | Schroeder |
| 5,909,901 A | 6/1999 | Zillig et al. |
| 5,992,515 A | 11/1999 | Spiegel |
| 6,012,550 A | 1/2000 | Lee |
| 6,253,837 B1 | 7/2001 | Seiler et al. |
| 6,499,666 B1 | 12/2002 | Brown |
| 6,527,046 B1 | 3/2003 | White |
| 6,719,208 B2 | 4/2004 | Brown |
| 6,740,000 B2 | 5/2004 | Wakayama |
| 6,742,716 B1 | 6/2004 | Dupres et al. |
| 6,764,020 B1 | 7/2004 | Zaho et al. |
| 6,772,715 B2 | 8/2004 | Pfeffinger et al. |
| 6,772,958 B1 | 8/2004 | Lamb et al. |
| 6,793,012 B2 | 9/2004 | Fang et al. |
| 6,799,631 B2 | 10/2004 | Acre |
| 6,830,527 B2 | 12/2004 | Wakayama |
| 6,863,221 B2 * | 3/2005 | Colas et al. .................. 236/34.5 |
| 6,935,569 B2 | 8/2005 | Brown et al. |
| 6,942,023 B2 | 9/2005 | Fang et al. |
| 6,962,295 B2 | 11/2005 | Ieda |
| 6,988,364 B1 | 1/2006 | Lamb et al. |
| 7,070,118 B2 | 7/2006 | Kawasaki et al. |
| 7,114,661 B2 | 10/2006 | Goedde |
| 7,143,822 B2 | 12/2006 | Wisniewski |
| 7,165,513 B2 | 1/2007 | Humburg |
| 7,172,135 B2 | 2/2007 | Masuko et al. |
| 7,254,947 B2 | 8/2007 | Burk et al. |
| 7,267,084 B2 | 9/2007 | Lutze et al. |
| 7,267,086 B2 | 9/2007 | Allen et al. |
| 7,275,697 B2 | 10/2007 | Roman et al. |
| 7,299,994 B2 | 11/2007 | Brown et al. |
| 7,487,826 B2 | 2/2009 | Pineo et al. |
| 7,490,662 B2 | 2/2009 | Eliades et al. |
| 7,506,664 B2 | 3/2009 | Norris et al. |
| 7,527,087 B2 | 5/2009 | Desai et al. |
| 7,540,431 B2 | 6/2009 | Kozdras et al. |
| 7,617,700 B2 | 11/2009 | Lamb et al. |
| 7,617,989 B2 | 11/2009 | Caleffi |
| 7,721,973 B2 * | 5/2010 | Peric ........................... 236/93 R |
| 7,735,546 B2 | 6/2010 | Bird et al. |
| 7,854,256 B2 | 12/2010 | Pineo et al. |
| 2001/0003312 A1 | 6/2001 | Spiegel |
| 2002/0128107 A1 | 9/2002 | Wayayama |
| 2003/0019620 A1 | 1/2003 | Pineo et al. |
| 2003/0136855 A1 | 7/2003 | Brown |
| 2004/0134650 A1 | 7/2004 | Acre |
| 2004/0232249 A1 | 11/2004 | Brown et al. |
| 2005/0145706 A1 | 7/2005 | Cardinali Ieda |
| 2006/0016900 A1 | 1/2006 | Brown et al. |
| 2006/0060347 A1 | 3/2006 | Moser et al. |
| 2006/0076129 A1 | 4/2006 | Eliades et al. |
| 2006/0108435 A1 | 5/2006 | Kozdras et al. |
| 2006/0201455 A1 | 9/2006 | Chanfreau et al. |
| 2007/0029398 A1 | 2/2007 | Conlin |
| 2007/0090200 A1 | 4/2007 | Lamb et al. |
| 2007/0137709 A1 | 6/2007 | Kempf et al. |
| 2007/0158059 A1 | 7/2007 | Pineo et al. |
| 2007/0164123 A1 | 7/2007 | Willers et al. |
| 2008/0029246 A1 | 2/2008 | Fratantonio et al. |
| 2008/0093006 A1 | 4/2008 | Dillard et al. |
| 2008/0093066 A1 | 4/2008 | Bird et al. |
| 2008/0110159 A1 | 5/2008 | Komiyama et al. |
| 2008/0179051 A1 | 7/2008 | Willis et al. |
| 2008/0245881 A1 | 10/2008 | Peric |
| 2009/0025922 A1 | 1/2009 | Strzelczyk et al. |
| 2009/0026405 A1 | 1/2009 | Sheppard et al. |
| 2009/0107137 A1 | 4/2009 | Lionello et al. |
| 2009/0173798 A1 | 7/2009 | Mabboux |
| 2009/0199916 A1 | 8/2009 | Kozdras et al. |
| 2009/0304531 A1 | 12/2009 | Vanderwees |
| 2010/0032490 A1 | 2/2010 | Mabboux |
| 2010/0126594 A1 | 5/2010 | Sheppard |
| 2010/0126598 A1 | 5/2010 | Peric et al. |
| 2010/0175640 A1 | 7/2010 | Sheppard |
| 2011/0042060 A1 | 2/2011 | Pineo et al. |

* cited by examiner

COOLER BYPASS APPARATUS AND INSTALLATION KIT

CROSS REFERENCE TO CO-PENDING APPLICATIONS

This application claims priority benefit to the filing date of U.S. Provisional Patent Application Ser. No. 61/242,148, filed Sep. 14, 2009 and U.S. Provisional Patent Application Ser. No. 61/305,226, filed Feb. 17, 2010, both entitled "Cooler Bypass Apparatus and Installation Kit", the contents of each being incorporated herein by reference.

BACKGROUND

The present invention relates to cooler bypass assemblies which permit fluid flow to a cooler only when the temperature of the fluid is above a certain temperature.

Cooler by-pass assemblies are connected to machinery that has fluid which may need to be cooled. A typical example of such machinery is an automotive transmission.

Cost reduction and fuel economy improvement initiatives brought about the need for a device that can cheaply and effectively regulate transmission fluid temperatures. This device is intended to ensure that the transmission fluid ramps up to optimum operating temperature as quick as possible and then regulates the fluid at that optimum temperature once it has been reached resulting in a measurable improvement in fuel economy.

The device typically includes a thermal relief valve circuit. The thermal relief circuit includes a thermal actuator which acts upon a ballcheck valve when the optimum transmission fluid temperature has been reached, opening the valve and allowing the fluid to flow through the transmission cooler circuit. As the transmission fluid cools, the thermal actuator modulates the valve effectively regulating the transmission fluid temperature at the nominal operating temperature.

Until such time that the transmission fluid reaches optimum temperature, the fluid is forced to re-circulate through the bypass circuit back to the transmission. The recirculation of transmission fluid bypassing the cooler circuit results in a reduced warm-up time. This results in an even greater improvement in fuel economy in colder climates. Once the fluid has reached optimum temperature, the thermal relief valve opens and fluid begins circulation through the cooler circuit before returning to the transmission.

One of the design considerations for a transmission cooler bypass assembly is the positioning of the bypass assembly within the extremely confined environment of a modern vehicle engine compartment. Since space is at a premium in such an environment, the bypass assembly must be able to be installed in a small space and, more importantly, and be adaptable to the available space within the engine compartment.

This consideration is even more important for an aftermarket cooler bypass apparatus where the engine compartment and heat exchanger or radiator were not initially designed to accommodate a cooler bypass assembly. This creates a need for a bypass assembly which has an adaptable mounting configuration to accommodate different available spaces within an engine compartment.

Thus, it would be desirable to provide a cooler bypass assembly and installation kit which enables the bypass assembly to be easily connected to a heat exchanger, such as a vehicle radiator, and to accommodate the available confined space within an engine compartment. It would also be desirable to provide an improved cooler bypass assembly and kit which can be used to install a transmission cooler bypass assembly as an aftermarket product on an existing vehicle.

SUMMARY

A bypass valve adapted to be fluidically coupled between a heat exchanger and a device carrying fluid that needs to be cooled. The bypass valve includes a housing having an inlet port and first and second outlet ports disposed in fluid flow communication with a fluid flow passage in the housing. Thermal responsive means are disposed in the housing for opening and closing the first and second outlets to fluid flow from the inlet in response to the temperature of fluid in the passageway in the housing.

In one aspect, the thermal response means includes at least one valve and first and second valve seats respectively associated with the first and second outlet ports. The at least one valve member is disposed in the fluid passageway in the housing to control the flow of fluid in the passageway between the inlet and each of the first and second outlet ports. A thermal actuator is mounted in the housing and controls movement of the valve between a first position allowing fluid flow between the inlet port and the first outlet port at fluid temperatures below a preset temperature and simultaneously blocking fluid flow between the inlet port and the third outlet port, and a second position blocking fluid flow between the inlet port and the first outlet port at fluid temperatures above the preset temperature and simultaneously allowing fluid flow between the inlet port and the third outlet port.

The thermal actuator normally positions the valve in the first position allowing fluid flow between the inlet port and the first outlet port at fluid temperatures below the preset temperature.

The valve member has a first seal for sealingly engaging the first valve seat when the valve is in the first position and a second seal for sealingly engaging the second valve seat when the valve is in the second position.

In another aspect, the at least one valve includes a first valve member movably disposed in the housing for opening and closing fluid flow through the first outlet port from the inlet port. A second valve is also disposed in the housing for opening and closing fluid flow through the second outlet port from the first inlet. The thermal response means includes thermal actuator means, coupled to the first and second valves, for moving the first and second valves between the open and closed positions in response to fluid temperature.

In one aspect, the thermal actuator means simultaneously moves the first valve to the open position and the second valve to the closed position and, alternatively, simultaneously moves the first valve to the closed position and the second valve to the opened position.

The thermal actuator means may include a single thermal actuator coupled to the first and second valves.

A valve housing is disposed in the housing and carries a first seal defining in part the first valve and a second seal defining in part the second valve. A return spring acts between the housing and the valve housing for normally biasing the valve housing to a position in which the first valve is opened and the second valve is closed to fluid flow. An over-travel spring can also be disposed between the valve housing and the thermal actuator for coupling movement of the thermal actuator to movement of the valve housing.

A guide member may also be mounted in the housing. The guide member carries apertures defining a portion of the fluid flow passageway through the housing to the second outlet port. The thermal actuator has an extensible piston fixably coupled to the guide member.

In another aspect, the thermal actuator means may include first and second thermal actuators respectively coupled to the first and second valves. The first thermal actuator is operative to open the first valve to fluid flow from an inlet port through the first outlet and the second thermal actuator is operative to move the second valve to a closed position blocking fluid flow from the inlet port through the second outlet at a first low temperature. The second thermal actuator is operative to move the second valve to an open position while the first valve is in the open position to allow partial fluid flow from the inlet port through both of the first and second outlets simultaneously at a second temperature higher than the first temperature. The first thermal actuator is operative to move the first valve to a closed position when the second valve is in the open position at a third temperature higher than the second temperature to allow fluid flow only from the inlet port to the second outlet to a cooler fluid flow loop In one aspect, the valve housing has a hollow end portion. The first thermal actuator is mounted in the hollow end portion of the valve housing. A return spring is disposed between the housing and the valve housing for normally biasing the first valve to an open position allowing fluid flow from the inlet through the first outlet.

In another aspect, the passageway in the housing includes a restricted flow opening separating the flow passage into a first bore portion extending from the restricted opening to the first outlet and a second bore portion extending from the inlet port to the second outlet.

In another aspect, a first thermal actuator is mounted in the housing and controls the first valve for movement of the first valve between a fluid flow allowing position between the inlet port and the first outlet of the housing at fluid temperatures below a first preset temperature and a fluid flow blocking position between the inlet port and the second outlet port of the housing at fluid temperatures above the second preset temperature. The second thermal actuator is mounted in the housing and controls the second valve for movement of the second valve between a fluid flow blocking position between the inlet port and the second outlet port of the housing at fluid temperatures below a first preset temperature and a fluid flow allowing position between the inlet port and the second outlet port of the housing at fluid temperatures above the first preset temperature.

The first thermal actuator normally positions the first valve in a normally closed position at fluid temperatures below the second preset temperature; and the second thermal actuator normally positions the second valve in a normally closed flow position at fluid temperatures below the first present temperature.

In a modification applicable to all aspects of the bypass valve and cooler bypass apparatus, a heater is fluidically coupled to the second fluid connection between the first outlet of the first body and the first inlet of the second body. The heater transfers heat to the fluid flowing from the outlet of the first body to the first inlet of the second body whenever the second valve is in a fluid flow allowing position.

In another aspect, a heater is fluidically coupled to the outlet of the second body. The heater transferring heat to the fluid flowing from the outlet of the second body whenever fluid is flowing through the second body.

In another aspect, a cooler bypass apparatus is coupled to a heat exchanger carrying coolant fluid and coupled to a device having fluid that needs to be cooled by first and second conduits. A first conduit is fluidically coupled to an inlet of the heat exchanger, and a second conduit is fluidically coupled to an outlet of the heat exchanger. The cooler bypass apparatus is fluidically interposed between the first and second conduits and the heat exchanger and includes a first body having a first inlet adapted to be fluidically coupled by a first connection to the first conduit, a first outlet, a second outlet adapted to be coupled by a third connection to the heat exchanger inlet, and a bore formed in the first body extending between the first inlet and the first and second outlets. A second body has a first inlet, a second inlet adapted to be connected by a second connection to the outlet of the heat exchanger, a first outlet adapted to be fluidically coupled by a third connection to the second conduits, and a bore extending between the first and second inlets and the first outlet. A second fluid connection is provided between the first outlet of the first body and the first inlet of the second body.

A thermal actuator is fluidically coupled to the bore in the first body for normally blocking fluid flow between the inlet port and the second outlet of the first body at fluid temperatures below a preset temperature and unblocking fluid flow between the inlet port and the second outlet of the first body at fluid temperatures above the preset temperature. A check valve is fluidically coupled to the first outlet in the first body blocking flow from the first outlet through the second connection when fluid pressure is less than a normal biasing force exerted on the check valve and allowing flow from the first outlet through the second connection when the fluid pressure is greater than the biasing force acting on the check valve.

In another aspect, the cooler bypass includes a first body having a first inlet adapted to be fluidically coupled by a first connection to the first conduit, a first outlet, and a second outlet adapted to be coupled by a third connection to the heat exchanger inlet. A bore is formed in the first body extending between the first inlet and the first and second outlets. A second body has a first inlet, a second inlet adapted to be connected by a second connection to the outlet of the heat exchanger, a first outlet adapted to be fluidically coupled by a third connection to the second conduits, and a bore extending between the first and second inlets and the first outlet. A second fluid connection is provided between the first outlet of the first body and first inlet of the second body.

A thermal actuator and a check valve are fluidically coupled to the first body to form a bypass fluid loop between the first and second conduits and the first and second bodies when the temperature of the fluid is lower than a preset temperature, and forming a cooling loop between the first and second conduits, the first body, the heat exchanger and the second body when the fluid temperature is higher than the preset temperature.

In another aspect, a bypass cooler assembly kit is adapted for use in providing a cooler bypass loop between first and second conduits extending from an existing device carrying fluid that needs to be cooled and an existing heat exchanger having a fluid inlet and a fluid outlet. The kit includes:

a first body having a first inlet adapted to be fluidically coupled by a first connection to the first conduit, a first outlet, and a second outlet adapted to be coupled by a third connection to the heat exchanger inlet, a thermal actuator adapted to be fluidically coupled to the bore in the first body for normally blocking fluid flow between the first inlet and the second outlet of the first body at fluid temperatures below a preset temperature and unblocking fluid flow between the first inlet and the second outlet of the first body at fluid temperatures above a preset temperature, a check valve adapted to be fluidically coupled to the first outlet in the first body for blocking flow from the first outlet through the second connection when fluid pressure is less than a normal biasing force exerted on the check valve and allowing flow from the first outlet through the second connection when the fluid pressure is greater than the biasing force acting on the check valve, first and second elbows, each having a through bore extending between first and second ends;

quick connections carried on the first and second ends of the fluid carrying actuators;

a tee fluid carrying actuator having first, second and third flow passages interconnected by an internal bore;

quick connections carried on the thermal actuator and the check valve;

a plurality of quick connector retainer clips engagable with the quick connections; and at least one flexible conduit adapted for interconnection between the quick connections.

The kit may also include a plurality of rigid pipe stubs, each pipe stub having a quick connect endform adjacent one end. The pipe stubs are insertable into opposition ends of the at least one flexible conduit for connecting the flexible conduit to the quick connections.

A method of installing a cooler bypass apparatus to a heat exchanger carrying coolant fluid coupled by first and second conduits to a device with fluid that needs to be cooled comprises the steps of:

providing a first body having a first inlet adapted to be fluidically coupled by a first connection to the first conduit, a first outlet and a quick connector coupled to the inlet.

providing a second outlet adapted to be coupled by a third connection to the heat exchanger inlet.

fluidically connecting the first outlet of the first body to the first inlet of the second body by a second fluidic connection.

fluidically coupling a thermal actuator in the bore in the first body for normally blocking fluid flow between the first inlet and the second outlet of the first body at fluid temperatures below a preset temperature and unblocking fluid flow between the first inlet and the second outlet of the first body at fluid temperatures above a preset temperature, and fluidically coupling a check valve to the first outlet in the first body for blocking flow from the first outlet through the second connection when fluid pressure is less than a normal biasing force exerted on the check valve and allowing flow from the first outlet through the second connection when the fluid pressure is greater than the biasing force acting on the check valve.

BRIEF DESCRIPTION OF THE DRAWING

The various features, advantages and other uses of the present cooler bypass apparatus and installation kit will become more apparent by referring to the following detailed description and drawing in which.

DETAILED DESCRIPTION

Figure 1:
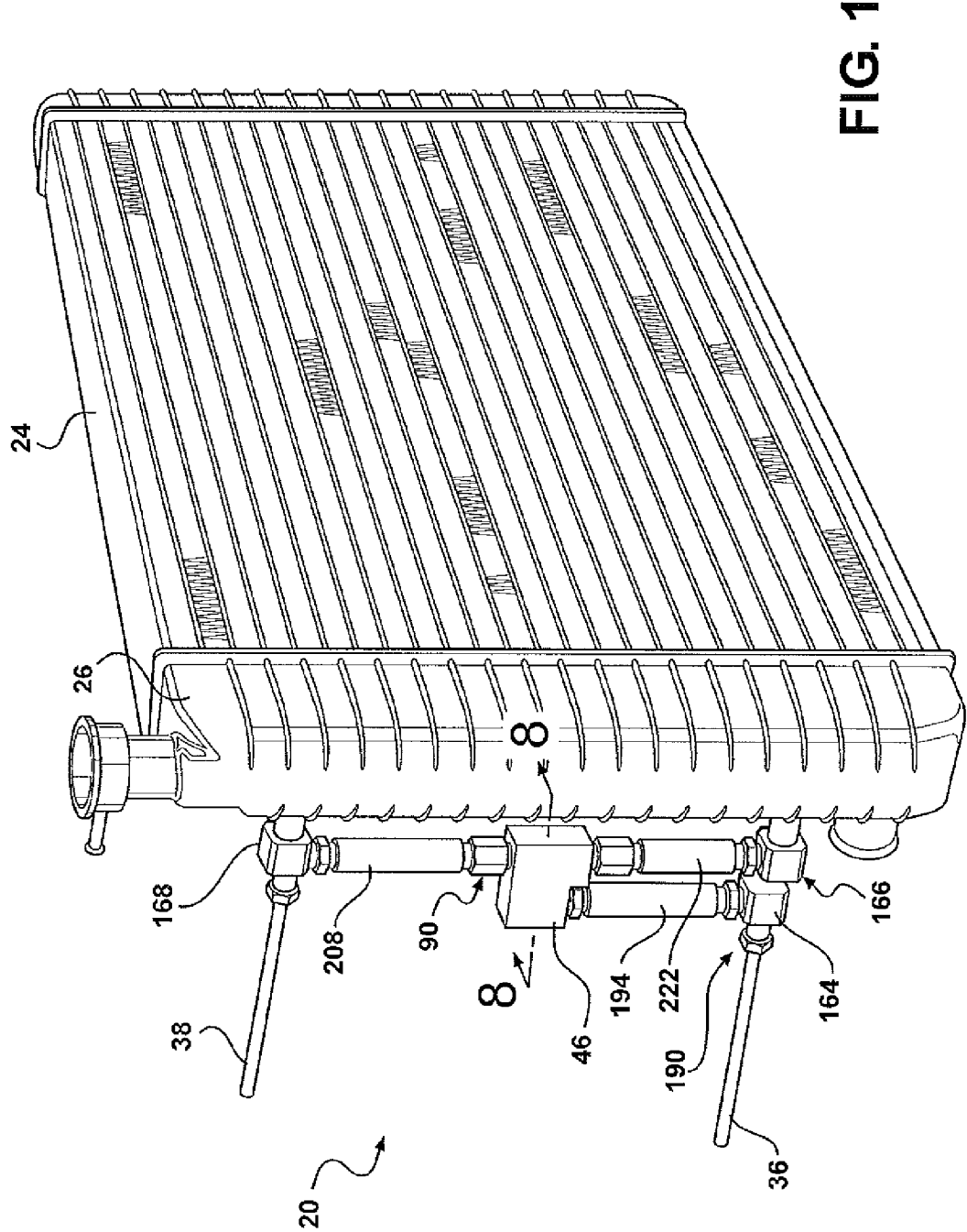
FIG. 1 is a front perspective view of a cooler bypass apparatus mounted on a radiator side cap.

With reference to FIGS. 1-9, one aspect of a cooler bypass apparatus 20 is mounted between machinery having a fluid which needs to be cooled, shown pictorially by way of example only as a transmission 22, and a heat exchanger 24. In this aspect, the heat exchanger 24 is depicted as a combo-radiator or combo-cooler in which a side caps 26 is mounted on one side of the radiator 24 and carries fins exposed to the coolant in the main heat exchanger or radiator 24. The apparatus 20 is also useable with a radiator 24 without a side cap or combo-cooler 26. One or more transmission fluid carrying fins 28 are mounted within the side cap 26 and coupled to the transmission fluid flow path or circuit, as described hereafter. The fins 28 provide heat exchange between the hotter or higher temperature transmission fluid and the lower temperature radiator coolant.

Figure 2:
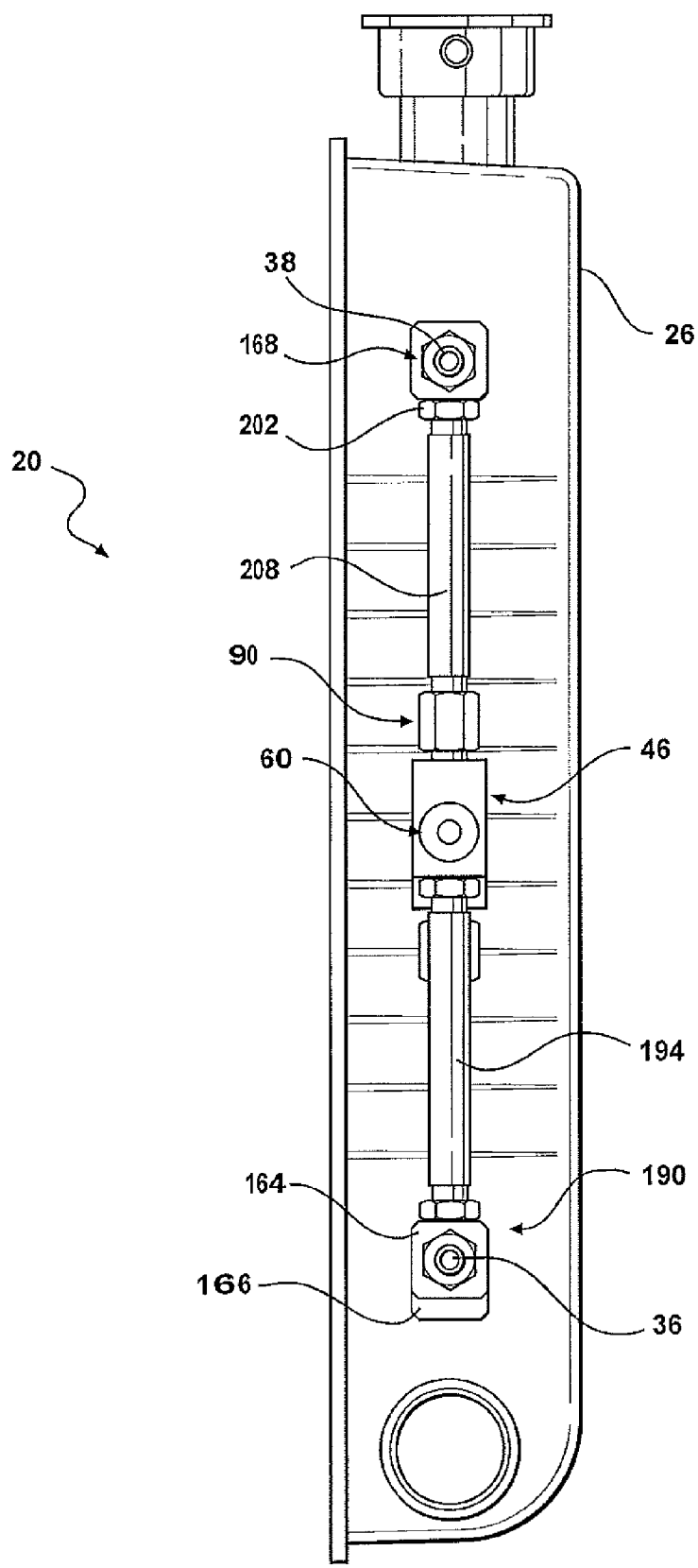
FIG. 2 is a rear elevational view of the cooler bypass shown in FIG. 2.
Figure 3:
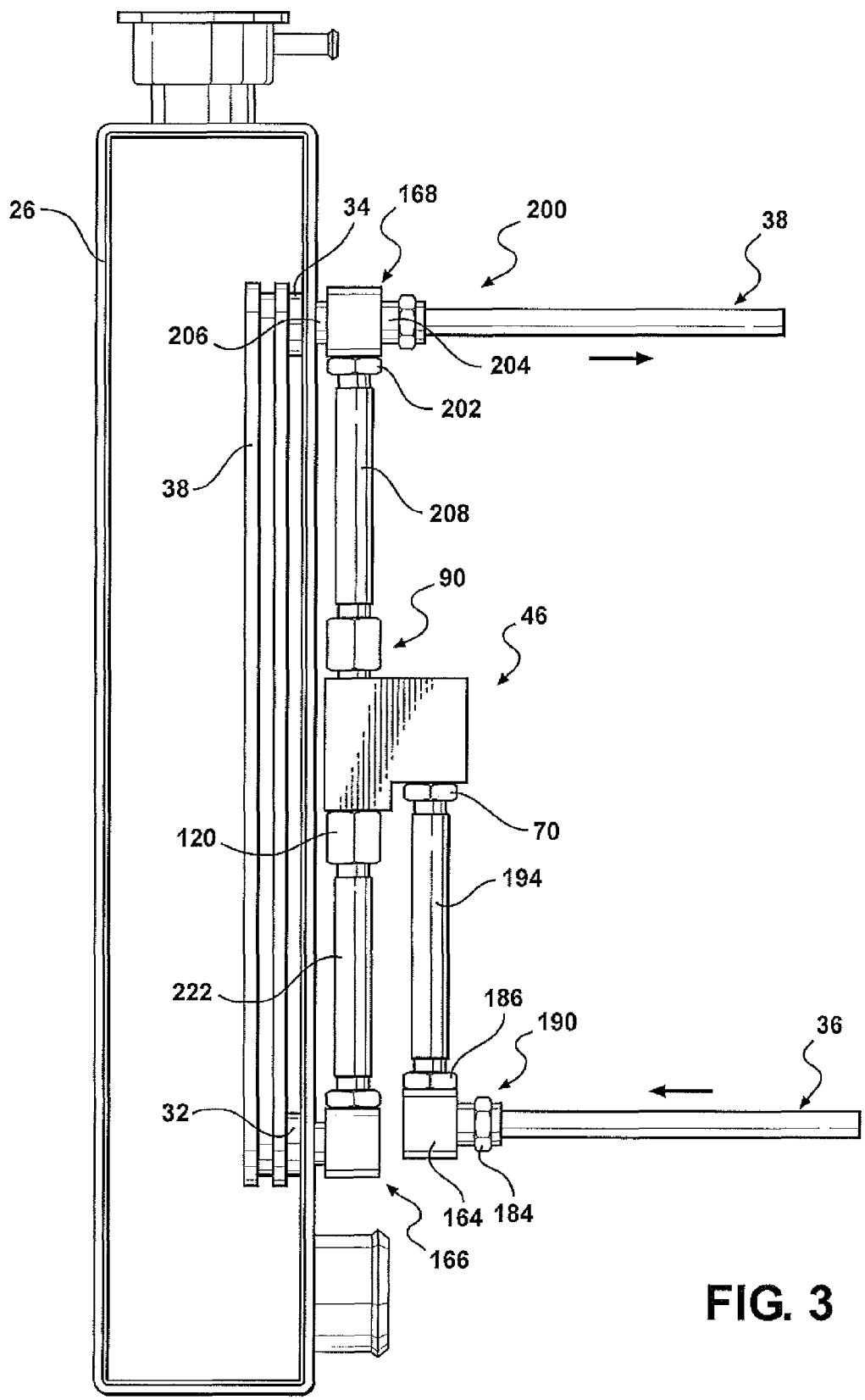
FIG. 3 is a partially cross sectioned side elevational view of the cooler bypass apparatus mounted on a radiator side cap as shown in FIGS. 1 and 2.

As shown in FIGS. 1, 2 and 3, an inlet connection 32 and an outlet connection 34 are mounted on the side cap 26 to provide fluid connections with an inlet conduit or pipe 36 and the outlet conduit or pipe 38. The inlet connection 32 and the outlet connection 34 can be any type of fluid coupling, such as, for example, an IQC quick connector sold by Jiffy-tite, Inc., Lancaster, N.Y.

Figure 4:
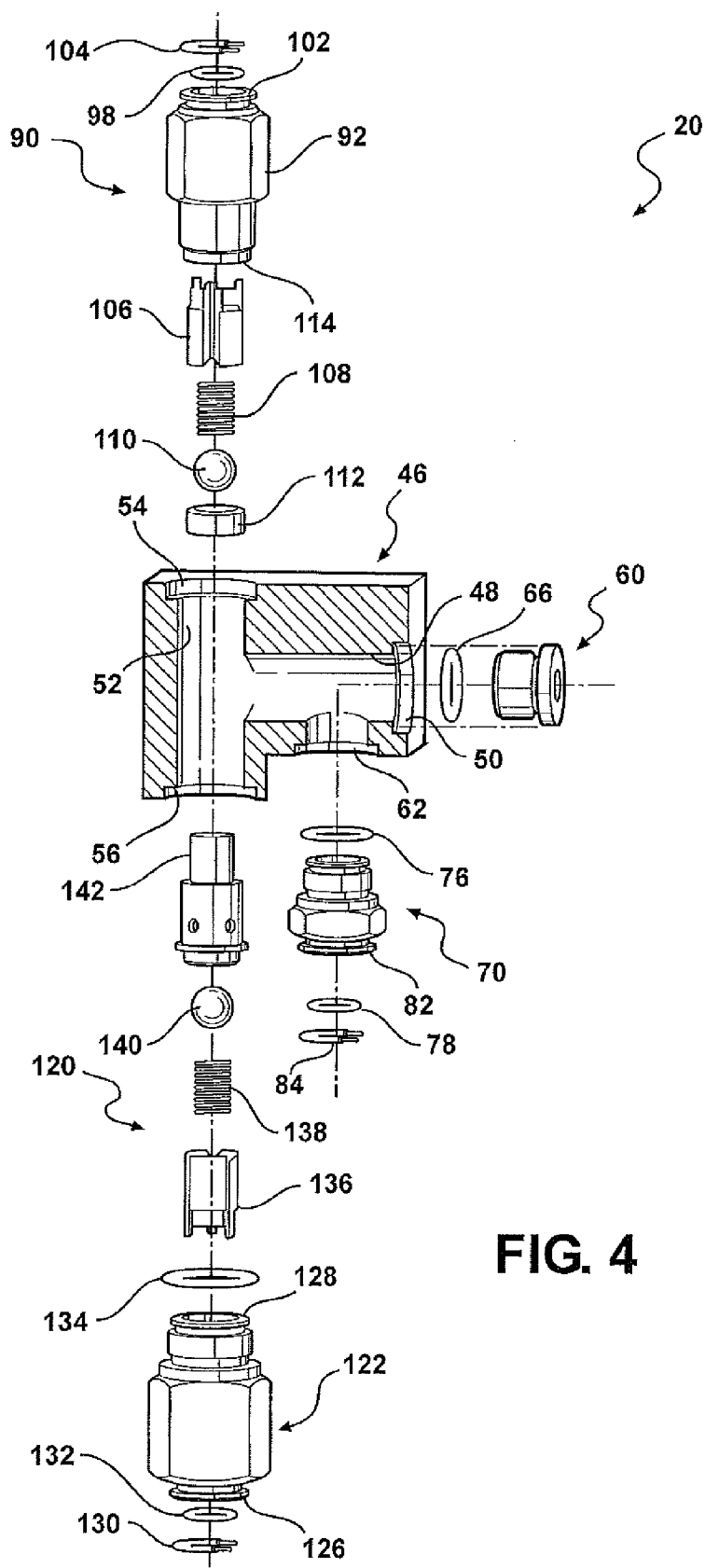
FIG. 4 is an exploded perspective view of the thermal release valve assembly shown in FIGS. 1, 2 and 3.
Figure 8:
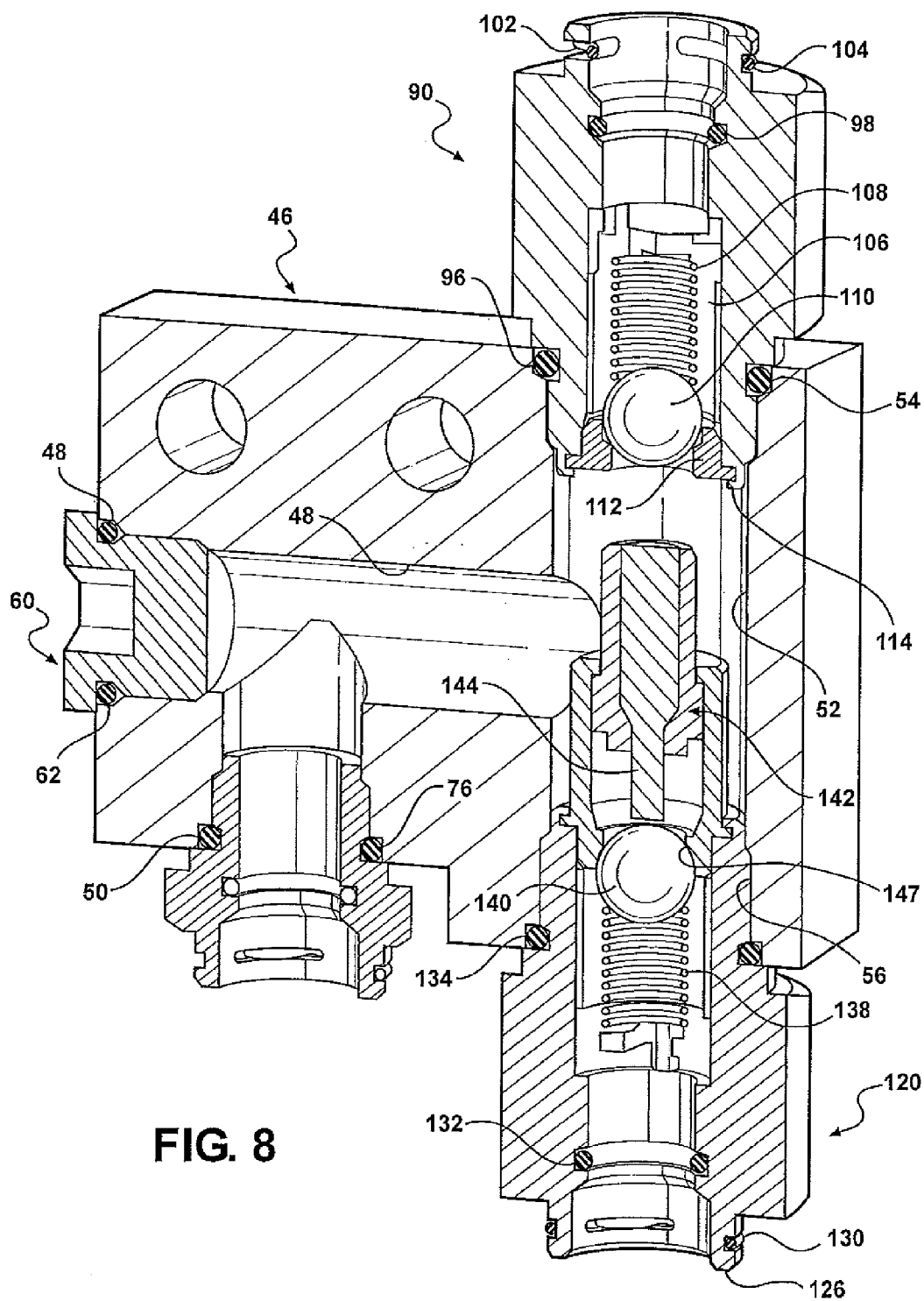
FIG. 8 is an enlarged, vertically cross sectioned view showing the assembly of the inlet connection, quick connect, quick connect ball check and thermal relief valve in the mounting block.

As shown in detail in FIGS. 4 and 8, the cooler bypass apparatus 20 includes a mounting block 46, typically formed of a suitable metal. The block 46 includes a first transverse bore 48 extending from an aperture 50. The transverse bore 48 intersects and is fluidically coupled to a longitudinal bore 52 in the block 46. The longitudinal bore 52 extends between a first outlet aperture 54 and a second output aperture 56.

A port plug assembly 60 is mounted in the aperture of the transverse bore 48 to seal the opening 50. The port plug assembly 60 includes a plug 64 and a seal member, such as an O-ring 66.

Figure 5:
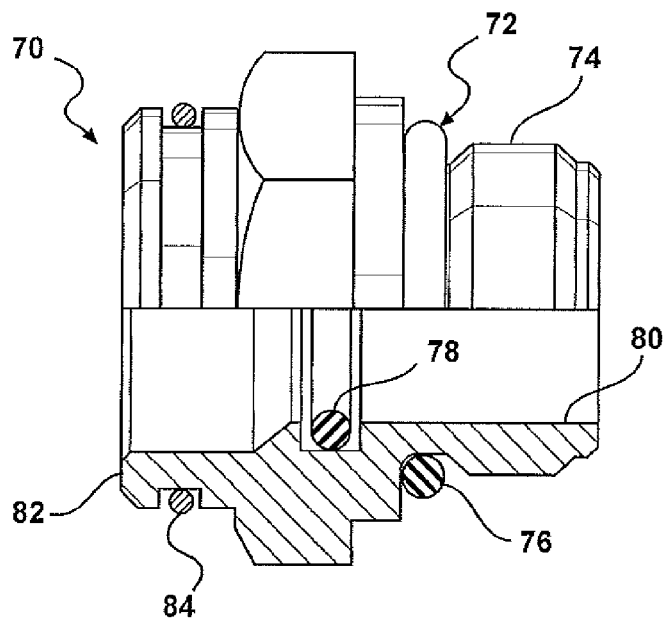
FIG. 5 is "a partially cross-sectioned" enlarged, side elevational view of the transmission fluid inlet connection quick connect shown in FIG. 4.
Figure 6:
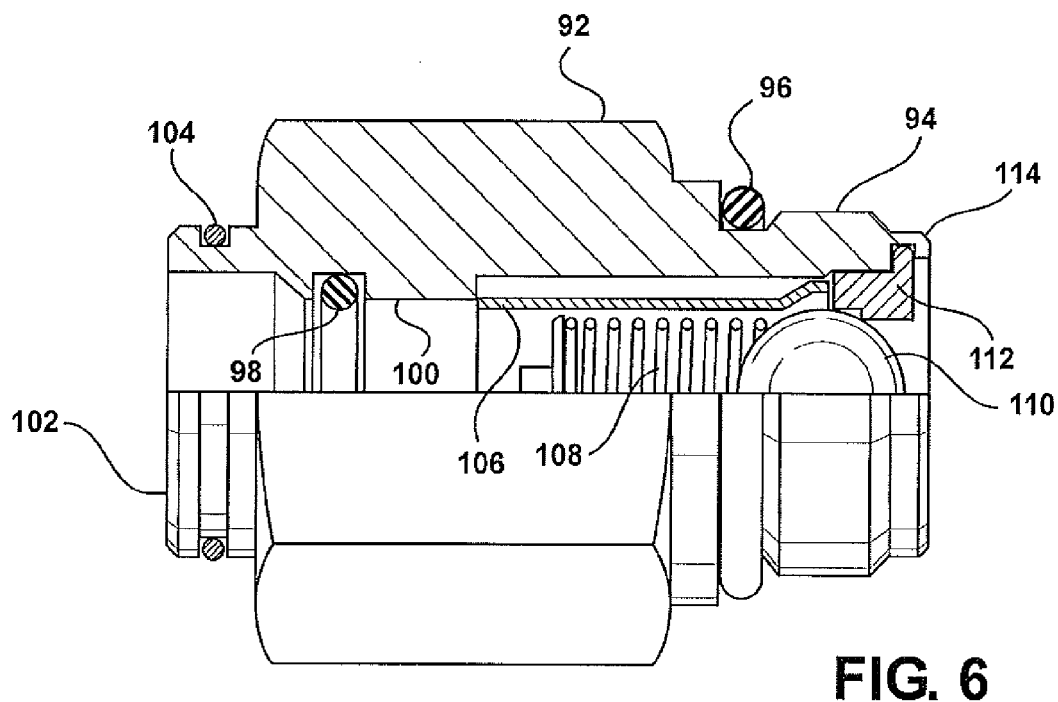
FIG. 6 is a partially cross sectioned, enlarged, side elevational view of the quick connect ball check assembly shown in FIG. 4.

As shown in detail in FIGS. 4 and 5, a fluid coupling 70, such as a quick connect coupling sold by Jiffy-tite, Inc., Lancaster, N.Y. as a BQC quick connect, is mounted in an inlet 62 in the block 46. The coupling 70 includes a body 72 having external threads 74 extending from one end for threading engagement with internal threads extending from the inlet 62 in the block 46. An external O-ring 76 is mounted on the quick connector body 72 for sealing the connection between the quick connect 70 and the inlet 50 in the block 46. An internal seal member or O-ring 78 is mounted within a through bore 80 extending through the quick connect body 72. The O-ring 78 sealingly engages one end of a fluid conduit inserted through a first end 82 of the quick connect body 72. A retainer clip 84 is mounted in an external slot in the body 72 and extends through openings formed in the slot into the insertion path of the conduit into the bore 80 in the body 72. The projections on the clip 84 engage a lock surface carried on one end of the conduit as described in greater detail in U.S. Pat. Nos. 4,538,679 and 4,640,534.

A check valve assembly 90 is also mounted on the block 46. As shown in FIG. 4, and in greater detail in FIGS. 6 and 8, the assembly 90 includes a body 92, typically formed of metal. External threads 94 are formed on one end of the body 92 for threading engagement with mating threads extending inward from the outlet aperture 54 in the block 46. An externally mounted seal member or O-ring 96 is carried on a recess on the body 92 for sealing the body 92 within the block 46. An internal seal member or O-ring 98 is mounted within a bore 100 extending through the body 92 to sealingly couple the body 92 to a fluid conduit inserted through a first end 102 of the body 92. A retainer clip 104 is mounted in an external slot adjacent the first end 102 of the body 92. The retainer 104, which may have the configuration of the retainer clip described in U.S. Pat. Nos. 4,538,679 and 4,640,534, includes radially inward extending projections which snap behind an enlargement or lock shape carried on the conduit to releasibly lock the conduit in the body 92.

A ball check sleeve 106 is mounted in the bore 100 concentrically about a biasing member or spring 108 and a ball check 110. An end member or plug 112 threadingly engages threads within the second end 114 of the body 92 to capture the spring 108 and the ball check 110 within the body 92.

As shown in FIG. 4, the check valve assembly 90 is mounted on the block 46 in an orientation such that the spring 108 biases the ball check 110 into the plug 112 thereby normally blocking fluid flow through the ball check valve 90 in a direction from a second end 114 to the first end 102 unless the pressure of the fluid flowing from the block 46 into the ball check 80 exceeds the biasing force of the spring 108. When this occurs, the fluid pressure overcomes the biasing force of the spring 108 and forces the ball check 110 away from the seat in the plug 112 thereby allowing fluid flow around the ball check 110 and through the bore 102 in the body 92 and the fluid conduit coupled to the body 92.

Figure 7:
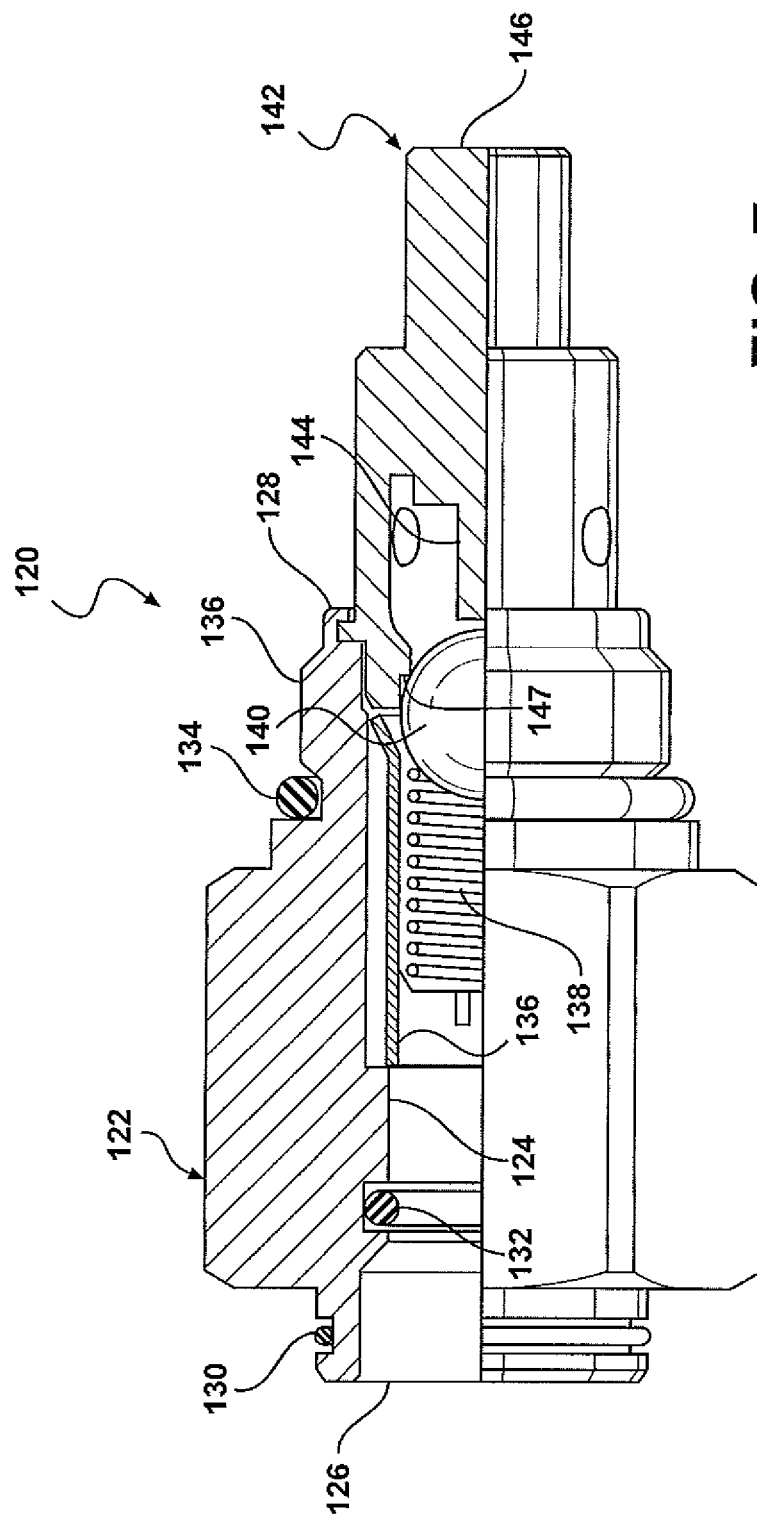
FIG. 7 is a partially cross-sectioned, enlarged, side elevational view of the thermal relief valve assembly shown in FIG. 4.

Referring now to FIGS. 4, 7 and 8, a thermal relief valve assembly 120 is also fluidically coupled and mounted in the block 46. The thermal relief valve assembly 120 includes a body 122, typically formed of a metal such as aluminum, with a through bore 124 extending from an aperture at a first end 126 and an aperture at an opposed second end 128. A retainer clip 130, similar to the retainer clip described in the quick connect shown in U.S. Pat. Nos. 4,538,679 and 4,640,534 is mounted in a recess spaced from the first end 126 of the body 122. The retainer clip 130 includes radially inward extending projections which snap-engage with a lock surface or bead on a fluid conduit inserted through the first end 126 into the bore 124 in the body 122 to lock the fluid conduit to the body 122.

A seal member or O-ring 132 is mounted in an internal recess in the body 122 opening to the bore 124 to sealingly couple the inserted conduit to the body 122. Another seal member or O-ring 134 is mounted in an external recess on the body 122 to sealingly couple the body 122 to the second outlet 56 in the block 46 when external threads 136 on the body 122 threadingly engage threads in the outlet 56 in the block 46.

A ball check sleeve 136 is mounted within the bore 124 and surrounds a biasing member or coil spring 138 and a ball check 140.

A thermal actuator 142 is fixed within the bore 124 from the second end 128 of the body 122. The thermal actuator 142, which may be crimped or otherwise fixably secured within the body 122, has extensible piston 144 which, in a normal, retracted position, is spaced from the forward-most movement position of the ball check 140 when the ballcheck 140 is moved to a flow blocking position by the biasing spring 128 within the bore 124. When the temperature of the fluid contacting the opposite end 146 of the thermal actuator 142 reaches a preset temperature, the thermal actuator 142 extends the piston 144 with sufficient force to overcome the biasing force of the spring 138 and to move the ballcheck 140 away from a valve seat 147 carried on one end of the thermal actuator 142. This allows fluid flow through the thermal actuator 142 and the bore 124 in the body 122 to the fluid conduit.

As shown in FIGS. 4 and 8, the thermal relief valve assembly 120 is coupled to the block 46 in an orientation such that the spring 138 biases the ball check 140 to the flow blocking position thereby normally blocking fluid flow though the thermal relief valve 120 when the temperature of the fluid flowing through the block 46 is below a preset temperature. When the fluid temperature reaches the preset temperature, the thermal actuator 142 extends the piston which moves the ball check 140 away from the valve seat 147 to allow fluid flow from the bore 52 in the block 47 through the thermal relief valve assembly 120 and the conduit coupled to the body 122 which is also coupled to the heat exchanger or radiator 24.

The fluid flow through the bore 52 in the block 46 and the thermal relief valve 120 reduces the fluid pressure within the bore 52. This pressure reduction allows the biasing spring 108 to force the ball check 110 back into engagement with the valve seat and the plug 112 blocking further fluid flow through the ball check 110 to the conduit coupled to the body 92.

Figure 9:
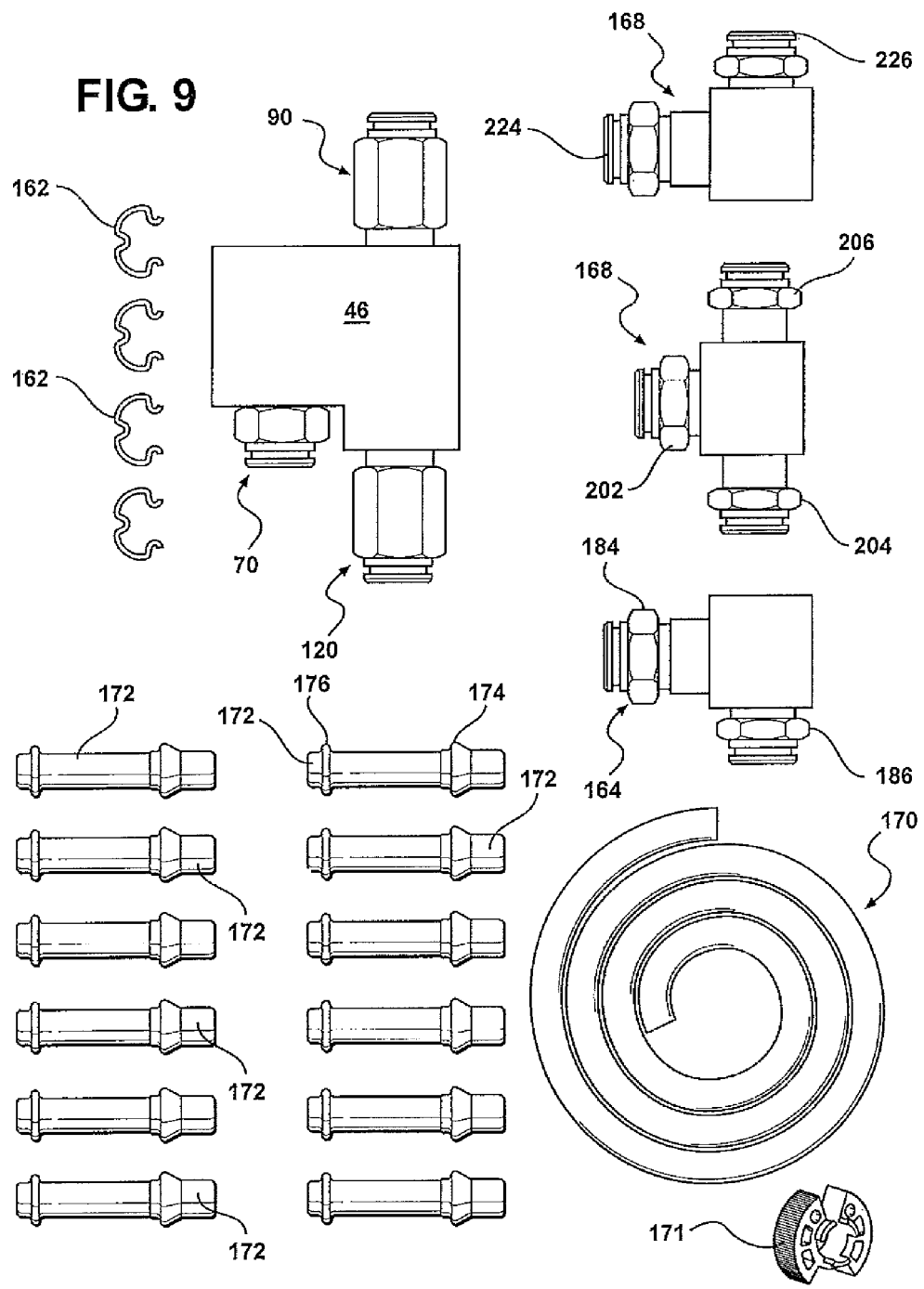
FIG. 9 is an exploded, perspective view of the cooler bypass valve assembly installation kit components.

According to one aspect of the present invention, an installation kit 160, shown in FIG. 9, is provided for simplifying the installation and attachment of the various components of the cooler bypass apparatus to a heat exchanger, such as a vehicle radiator or a vehicle combo-cooler 24. As shown in FIG. 9, the kit 160 includes the block 46, the connections 70, 90 and 120, a plurality of retainer clips 162 for connecting conduits and flexible hose segments to the connections 70, 90 and 120 as well as to fluid couplings including 90° elbows 164 and 166 and a tee 168. A quantity of flexible hose 170 is also provided in the kit 160. The hose 170 can be cut into segments of suitable lengths to suit the particular dimensions of cooler bypass installation.

A plurality of stubs 172 are also provided as part of the kit 160. The stubs 172 are formed of metal and define hollow conduits. Each stub 172 has an endform 174 spaced from one end which is adapted to be engaged by one of the retainer clips 162 when the stub 172 is inserted into one of the couplings 70, 90, 120, 164, 166 or 168. The opposite end of each stub 172 includes a hose bead 176 used to secure the hose to the stub 174 by a hose clamp not shown in FIG. 8, but also part of the kit 160.

A quick release tool 171 as described and illustrated in U.S. Pat. No. 5,909,901, may also be provided as part of the kit 160 to facilitate separation of the existing cooler conduits 36 and 38 coupled to the heat exchanger 24 in preparation for installation of the cooler bypass apparatus to the conduits 36, 38 and to the heat exchanger 24.

To install the cooler bypass assembly 20 on a heat exchanger 24, such as a vehicle radiator 24 or a vehicle combo-cooler 26, in an after market situation, the existing conduits 36 and 38 coupling the transmission fluid circuit to the heat exchanger 24 are disconnected from the inlet 32 and outlet 34 of the heat exchanger 24 by suitable means depending on the type of coupling. For example, if Jiffy-tite IQC quick connections are employed on the heat exchanger or radiator 24, the quick release tool can be employed to disengage the retainer clip from the endform on the conduits 36 and 38 to separate the conduits 36 and 38 from the couplings. In an original equipment application, the cooler conduits will not have been previously attached to the radiator such that the bypass assembly 20 can be attached directly to the radiator inlet 32 and outlet 34.

In assembling the cooler bypass apparatus 20 and attaching the cooler bypass apparatus 20 to the transmission conduits 36 and 38 into the heat exchanger or radiator 24, no particular order of assembly is necessary as the individual components of the cooler bypass 20 apparatus can be assembled in any order.

The following order of assembly and installation is to be considered as only one of numerous examples of an assembly and installation procedure.

First, the mounting block 46 has the coupling 70, check valve assembly 90, and the thermal relief valve assembly 120, described above, attached thereto. Next, an elbow coupling 164 which is in the form of a metal body having quick connections, such as Jiffy-tite BQC connections 184 and 186 integrally formed at opposite ends of the through The coupling 164 forms a part of a first connection 190 which also includes a hose segment 192, two pipe stubs 172 mounted within opposite ends of the hose segment 194, and retainer clips 162 to couple the endforms 174 on the pipe stubs 172 to the connector 186 on the coupling 164 and to the coupling 70 on the mounting block 46. It should be noted that hose clamps may be provided to secure each hose segment over the bead 176 on each pipe stub 172.

A second connection 200 includes the tee coupling 168 which has Jiffy-tite quick connectors 202, 204, and 206, such as Jiffy-tite BQC quick connectors, at each of the three apertures at the ends of intersecting bores in the tee coupling 168. A hose segment 208 having a pair of pipe stubs 172 mounted within opposite ends is connected to the coupling 90 and the second conduit 38 retainer clips 162 mounted in the connectors 202 on the tee coupling 168 and on the coupling 90.

The connector 204 couples the second flow conduit to the tee 168. The connector 206 couples the tee 168 to the connector 34 on the radiator 24.

A third fluid connection 220 includes the elbow coupling 166 which has Jiffy-tite quick connectors and retainer clips, such as Jiffy-tite BQC connectors, at opposite ends of a 90° bore extending through the coupling 166, a suitable length hose segment 222 which has a pair of pipe stubs 172 mounted in opposite ends and retainer clips 162 for coupling the endforms 174 on the pipe stubs 172 to the quick connection 224 at one end of the elbow coupling 166. A similar retainer clip 162 is employed at the opposite end of the hose segment 220 to couple one pipe stub 172 to the coupling 70 on the mounting block 46. The connection 226 couples to the radiator 24 inlet connections 32.

With the cooler bypass assembly interconnected as shown in FIGS. 1, 2 and 8, the elbow connections 164 and 166 can be attached by snap in connection to the first and second transmission flow conduits 32 and 34. The opposite connectors of the elbow connection 164 and quick connector 204 on the tee coupling 168 are snap connected to the first and second transmission flow conduits 34 and 34. The outlet connector 206 on the tee coupling 168 is then snap connected to the outlet coupling 36 on the radiator 24. Similarly, the elbow is coupled by the outlet connector 226 to the inlet coupling 38 of the radiator 24.

It should be noted in FIGS. 1, 2, and 8, that the use of the above-described quick connects at the various connections of the bypass apparatus 20, the transmission flow conduits 36 and 38, and the radiator inlet and outlet connections 32 and 34 enables each component of the bypass apparatus 20, such as the mounting block 46, the elbow couplings 164 and 166, the tee coupling 168, and the various connections to the coupling 70, the check valve assembly 90, and the thermal relief valve assembly 120 mounted on the block 46, to be easily rotatable about the axis of each couplings or connector. This enables each component of the bypass apparatus 20 to be easily positioned in the available space adjacent to the vehicle radiator 24 in a minimal amount of space as well as to enable the bypass apparatus 20 to be coupled between existing transmission flow conduits 36 and 38 without requiring modification of the shape or endforms of such conduits 36 and 38. For example, in the illustrated configuration, the transmission flow conduits 36 and 382 extend perpendicularly from the rear surface of the heat exchanger side cap 26. The bypass apparatus 20, when installed as described above between the transmission flow conduits 36 and 38, is configured in essentially the same vertical plane as the conduits 36 and 38 and immediately adjacent to the heat exchanger side cap 26. It will be understood that in other configurations of the flow conduits 36 and 38, the ends of the conduits 36 and 38 immediately adjacent to each connection to the heat exchanger or radiator 24, may have bends or turns. The rotatability of all of the connections in the bypass apparatus 20 still enable the bypass apparatus 20 to be mounted to the bent ends of the conduits 36 and 38 while still providing connection to the radiator inlet and outlet connections 32 and 34.

In operation, when the temperature of the transmission coolant or fluid is at ambient through non-operation of the vehicle engine or at the beginning of engine operation, the thermal relief valve 120 is in a normally closed position blocking fluid flow through the valve 120 between the bores 52 and 48 in the mounting block 46. In this manner, when the engine is started and transmission fluid begins to flow through the conduit 36, transmission fluid will flow through the first connection formed of the elbow coupler 164, and the hose segment 192 to the coupling 70 on the mounting block 46.

The transmission fluid will continue to flow through the bore 48 in the mounting block 46, and a portion of the bore 52 to the outlet 54 on the block 46. The pressure of the fluid will overcome the spring force of the ball check spring 108 in the ball check valve 90 causing movement of the ball check 110 away from the valve seat 112 thereby allowing flow of the transmission fluid through the ball check valve 90, the elbow 166, and back through the return fluid flow conduit 38 to the transmission 22. This bypass loop will enable the transmission fluid to continuously circulate within the transmission 22, without being exposed to the cooling effects of the radiator 24 until the temperature of the transmission fluid reaches a preset nominal operating temperature.

At this nominal operating temperature, the thermal relief valve 120 causes the piston 144 to extend thereby moving the ball check 140 away from the valve seat 147 and opening the thermal relief valve 120 to fluid flow. In this instance, there is a pressure drop within the bores 48 and 52 in the mounting block 46. This pressure drop allows the biasing spring 108 in the ball check valve 90 to bias the ball check 110 back into the valve seat 112 blocking fluid flow through the ball check 90 to the tee coupling 168. With the ball check 90 in a closed position, transmission fluid flow through the first conduit 36 is directed through the first connection 190 to the bore 52 and the bore 48 in the block 46. Fluid flow continues through the coupling 70 and through the third connection 220 to the inlet coupling 36 of the radiator 24. The transmission fluid is cooled as it flows through the radiator 24 before exiting through the outlet connection 38 and flowing through the tee coupling 168 back through the second transmission fluid flow conduit 38 to the transmission 22.

The bypass apparatus 20 modulates the temperature of the transmission fluid at the preset nominal operating temperature for maximum fuel economy due to minimal friction losses within the transmission 22. The bypass apparatus 20 modulates the opening and closing of the thermal relief valve 120 in response to temperature changes of the transmission fluid to regulate flow of the transmission fluid through the bypass circuit 20 without cooling in order to raise the temperature of the transmission fluid up to the nominal operating temperature, or directing the transmission fluid flow through the heat exchanger or radiator 28 to lower the temperature of the transmission fluid down to the nominal operating temperature.

Figure 10:
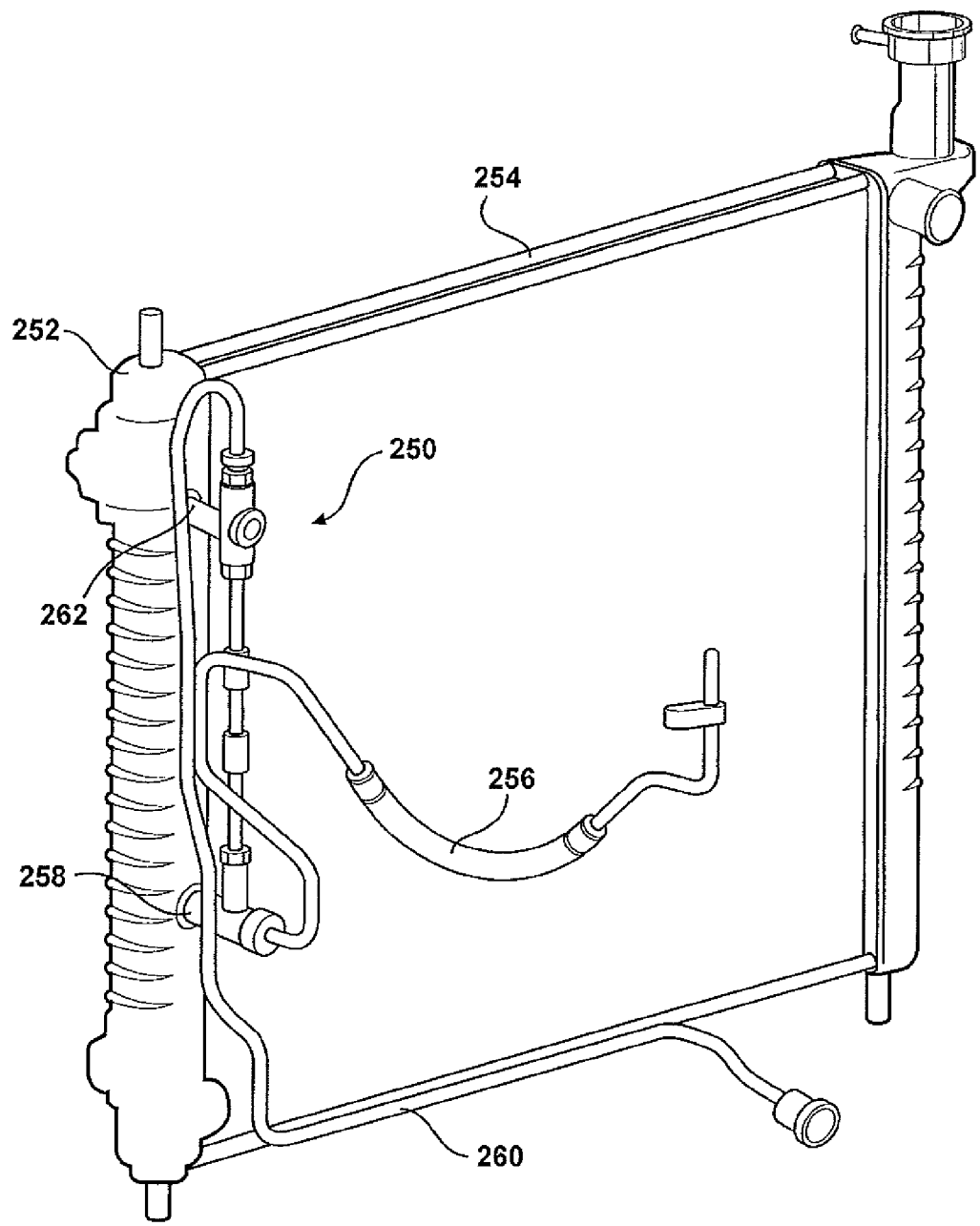
FIG. 10 is a perspective view of another aspect of a cooler bypass assembly mounted on a combo cooler.
Figure 11:
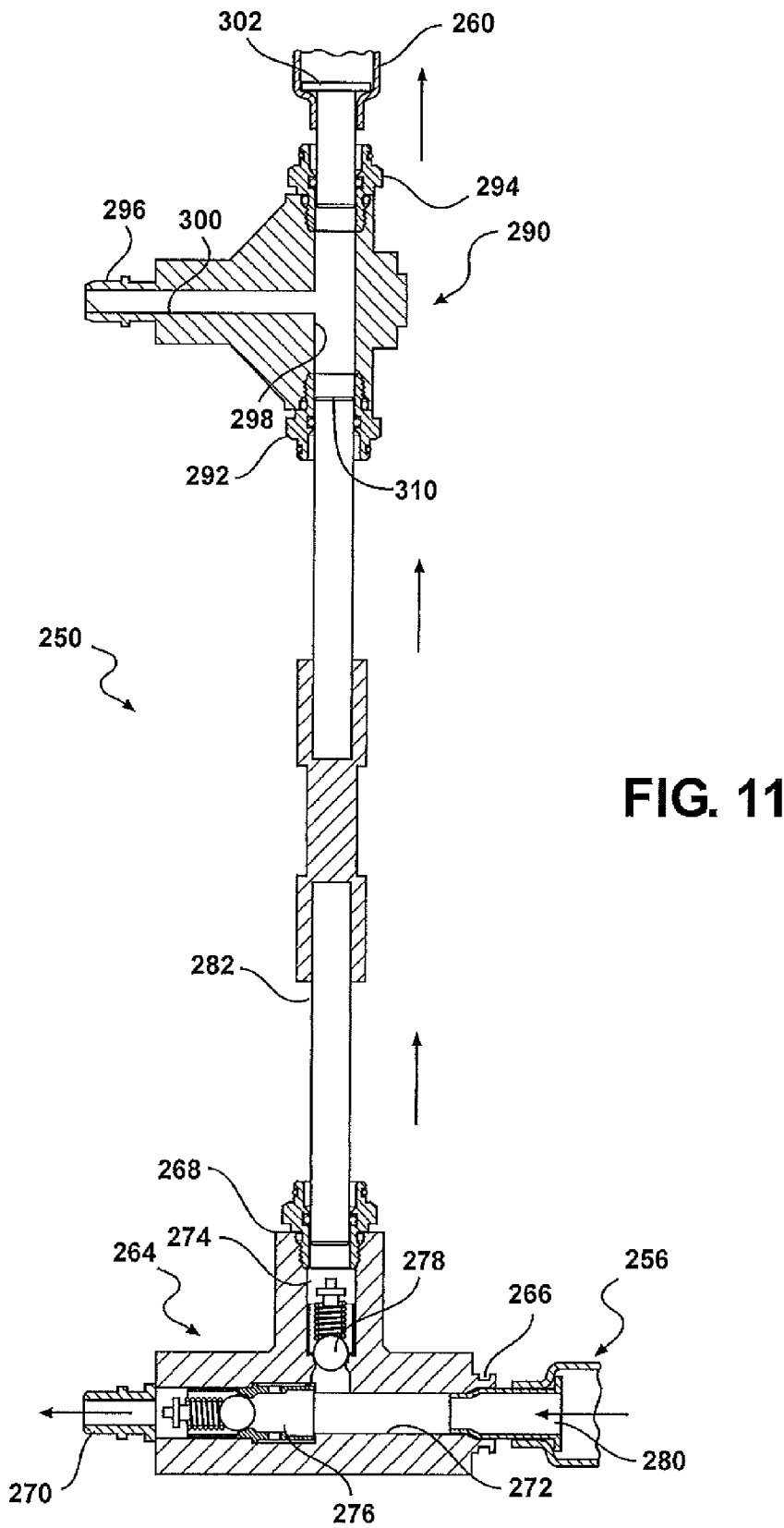
FIG. 11 is a vertically cross sectioned, side elevational view of the cooler bypass assembly components shown in FIG. 10.

Referring now to FIGS. 10 and 11, there is depicted another configuration and aspect of a cooler bypass apparatus 250. The bypass apparatus 250 operates in the same manner as the bypass apparatus 20 described above and shown in FIGS. 1-9. The bypass apparatus 250 may also be provided in a kit of components for easy assembly in an originally equipment manufacture or aftermarket installation situation.

In this aspect, the bypass apparatus 250 is coupled between a side cap 252 of a heat exchanger or vehicle radiator 254. Although not shown in FIG. 10, a plurality of radiator fins are mounted within the side cap 252 to provide flow of the engine coolant around the fins to remove heat from the transmission fluid flowing fins mounted within the side cap 252 as described above.

In this aspect, a first transmission flow conduit 256 which may be formed of a rigid metal or a combination of rigid metal and flexible hose or pipe segments extends from the outlet of the transmission housing, not shown, to a connection via the bypass apparatus 250 to an inlet coupling 258 on the side cap 252. A second return flow conduit 260 extends from another connection to the bypass apparatus 250 connected to an outlet connector 262 on the side cap 252 to return fluid flow to the transmission.

The bypass apparatus 250 includes a first coupling 264 in the form of a tee coupling having first inlet connection 266, a first outlet connection 268, and second outlet connection 270. A longitudinal through bore 272 extends between the first inlet connection 266 and the second outlet connection 270. An intersecting transverse bore 274 is also formed in the tee body 264 and intersects the longitudinal bore 272.

A thermal relief valve assembly 276, similar to the thermal relief valve assembly 120 described above and shown in FIGS. 4 and 7, is mounted in the longitudinal bore 272 between the intersection of the transverse bore 274 and the longitudinal bore 272 and the second outlet connection 270. A ball check valve assembly 278 is mounted in the transverse bore 274 between the intersection of the transverse bore 274 and the longitudinal bore 272 and the first outlet connection 268.

The functions of the ball check valve assembly 278 and the thermal relief valve assembly 276 are identical to the ball check valve 90 and the thermal relief valve assembly 120 described above. An endform 280, such as a pipe stub with an endform shape and a hose bead is mountable in a snap end connection via quick connector at the first connection 266 to couple the first transmission fluid flow conduit 256 to the tee body 264.

A similar quick connection is provided at the first outlet connection 268 on the tee body 264 to couple a conduit 282 of suitable length to the second outlet connection 268 of the tee body 264.

The second outlet connection 270, which forms a third fluid connection, may also be a quick connector type connection for snap end attachment to a quick connector coupling on the inlet 258 of the side cap 252 of the radiator 254 to releasibly attach the tee body 264 to the inlet 258 of the side cap 252.

The bypass coupling 250 also includes second fluid connection formed of a second tee-shaped body 290 having a first inlet coupling 292, a first outlet coupling 292 and a second inlet coupling 296. The second tee body 290 has a longitudinal bore 298 extending between the first inlet coupling 292 and first outlet coupling 294, and an intersecting transverse bore 300 extending from the second outlet 296 to the first outlet coupling 294.

An endform 302 mounted in one end of the second transmission conduit 260 is coupled to the second outlet connection 294 by a quick connect, such as a Jiffy-tite quick connect described above. A similar quick connection is provided for the second end of the conduit assembly 282 to the first inlet coupling 292. The second outlet coupling 296 on the tee body 290 is also in a form a quick connect for a snap end connection of the second tee body 290 to the outlet coupling 262 on the radiator side cap 252.

It should also be noted that the first inlet coupling 292 on the second tee body is formed as a slip fit connection. A seal member or O-ring 310 mounted on the conduit 282 for a limited amount of play or movement within the inlet coupling body 292. This allows the overall length of the conduit 282 to be adjusted depending upon the spacing between the tee bodies 264 and 290 so as to accommodate different configurations and spacings of the bypass apparatus 250 on a radiator 24.

The bypass apparatus 250 is assembled essentially in the same manner as the bypass apparatus 20 described above in that the tee bodies 264 and 290 are snap connected to the conduit apparatus 282. The endform connections 280 and 302 of the transmission flow conduits 256 and 260 are then coupled to the couplings 294 and 266 on the tee bodies 290 and 264. The tee bodies 264 and 290 are then snapped connected to the inlet and outlet couplings 258 and 262 on the radiator side cap 252.

The bypass apparatus 250 operates in the same manner as the previously described bypass apparatus 20 in that at transmission fluid temperatures below a preset nominal operating fluid temperature will cause the thermal relief valve 276 to be in a normally closed position blocking fluid flow from the inlet 266 to the second outlet 270 of the first tee body 264. Instead, the pressure of the transmission fluid will open the ball check valve assembly 278 allowing fluid flow between the first inlet 266 and the first outlet of the first tee body 264 through the conduit assembly 282, the bore 298 in the second tee body 290, and out through the transmission conduit 260 to the transmission without exposing the transmission fluid to the cooling effects of the fins in the radiator side cap 252.

When the temperature of the transmission fluid reaches the preset nominal operating temperature, the thermal relief valve assembly 276 will open allowing the transmission fluid to flow from the first inlet 266 of the first tee body 264 through the second outlet 270 to the inlet coupling 258 in the radiator side cap 252. The transmission fluid, after flowing through the fins within the side cap 252 and giving off heat to the coolant in the radiator 24, will flow through the side cap outlet coupling 262 and through the second tee body 290 back to the transmission through the return conduit 260.

The quick connect couplings uses to attach the tee bodies 264 and 290 of the bypass apparatus 250 to the radiator couplings and the transmission flow conduits 256 and 260 are also rotatable allowing the tee bodies 264 and 290 to be rotated to any desired position to attach different end configurations of transmission conduits 256 and 280 to different orientations and mounting positions of the radiator inlet and outlet couplings 258 and 262.

Referring now to FIGS. 12-16, there is depicted another aspect of a flow control assembly 350 which can replace the thermal relief valve and check valve combination in the assembly 20 shown in FIGS. 4 and 8 and/or the corresponding assembly 264 shown in FIG. 10. The flow control assembly 350 includes a generally rectangular cubical shaped block 354 which can be made of a suitable metal or plastic. The block 352 is formed with three ports 354, 356 and 358 which are all disposed in fluid communication internally within the block 352 by a bore 360.

A quick connection 362, which may be a Jiffy-tite BQC quick connect described in U.S. Pat. Nos. 4,538,679 and 4,640,534, is mounted in the first port 354 by suitable means, such as by a threaded connection, a press fit, a crimped connection, etc. The connection 362 defines an internal inlet passageway 364 extending between opposite ends of the quick connection 362. The passageway or through bore 364 in the quick connection 362 opens to fluid communication with the internal bore 360 in the block 352.

A similar quick connection 368, which may also be Jiffy-tite BQC quick connector, is mounted in the second port 356 of the block 352. The second quick connection 368 is fixedly mounted in the second port 356 by means of a threaded connection, a press fit connection, a crimped connection, etc. The quick connection 368 includes a through bore 370 extending between opposite ends which communicates with the internal bore 360 in the block 352.

A third quick connection 374 is fixedly mounted by threads, a press fit, a crimped connection, etc., in the third port 358 of the block 352. The third quick connection 374 also includes a through bore 376 extending between opposite ends which opens to fluid communication with the internal bore 360 in the block 350.

A thermal relief valve assembly 380 is coupled to the third quick connection 374. The thermal relief valve assembly 380 includes a generally cylindrical sleeve or housing 382 which has a through bore 384 extending between opposite ends. A plurality of apertures 386 are formed in the sleeve 382 and define fluid flow passages between the exterior of the sleeve 382 and the internal bore 384. A ball check seat 388 is formed at one end of the sleeve 382 for receiving a ball check 390 in a fluid blocking coupling. Another sleeve 392 is mounted in an enlarged portion of the bore 376 in the quick connection 374. The sleeve 392 has a spring seat 394 formed at one end for supporting a coil spring 396. The spring 396 engages the ball check 390 and normally biases the ball check 390 into engagement with the seat 388 in the sleeve 382 to block fluid flow from the apertures or passages 386 in the sleeve 382 through the valve seat 388 and into the bore 376 in the third quick connection 374.

Figure 12:
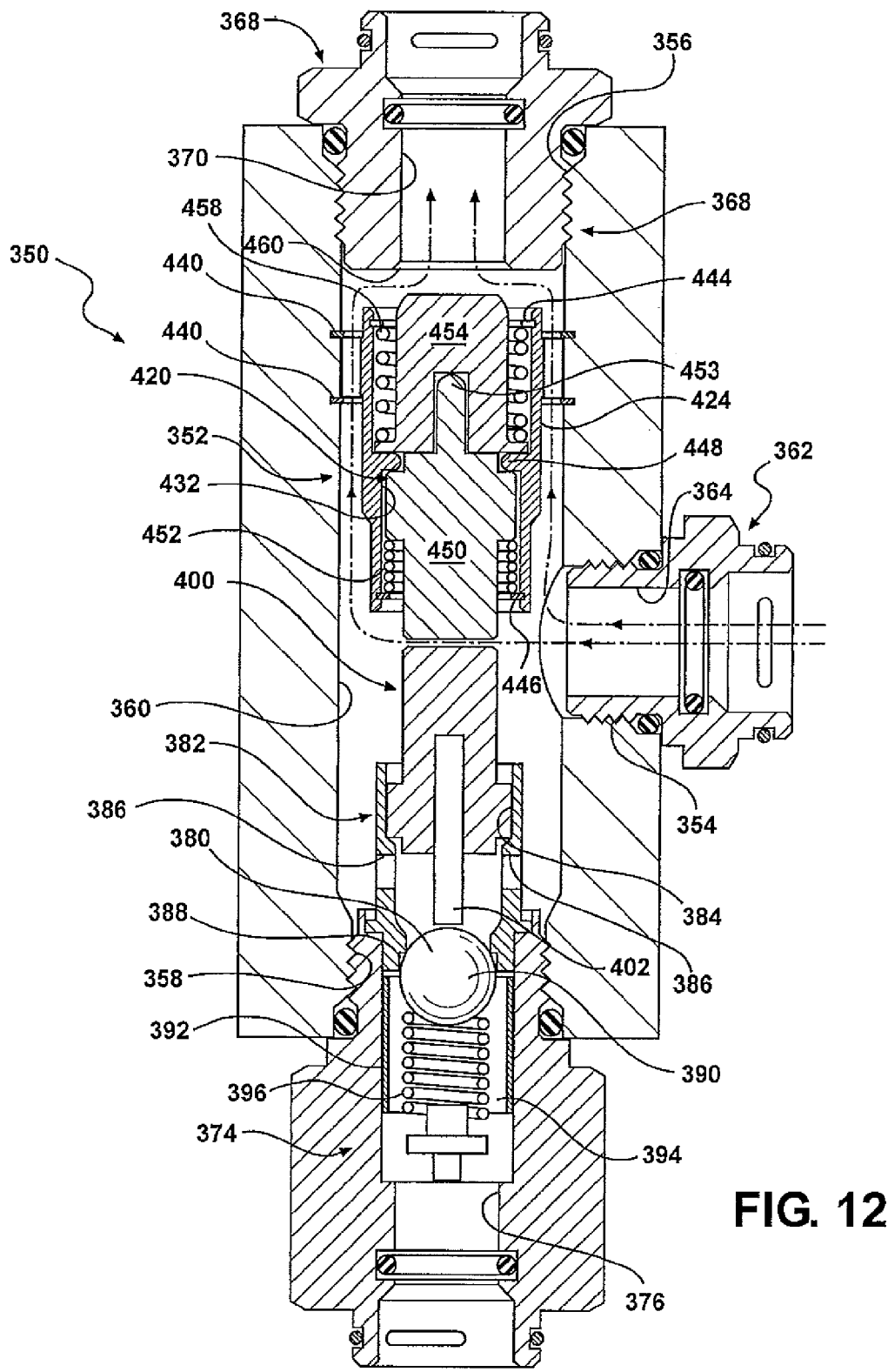
FIG. 12 is a vertical cross section view of another aspect of a cooler bypass apparatus which may be used in any of the aspect shown in FIG. 1-11, with the thermal relief valve assembly depicted in a cold fluid temperature operating state.
Figure 13:
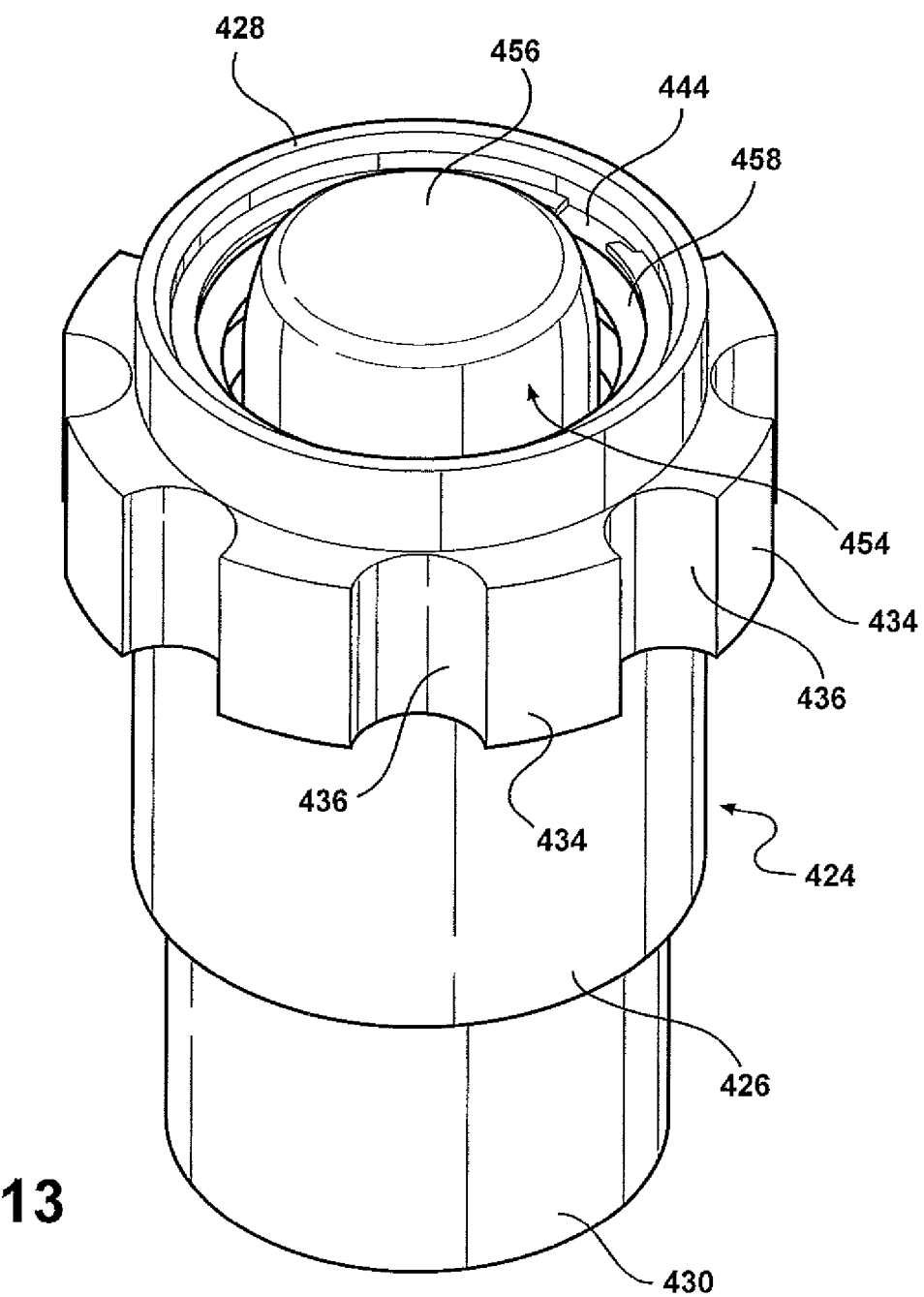
FIG. 13 is an enlarged, perspective view of the plunger and one of the thermal actuator valves in the thermal relief valve assembly shown in FIG. 12.
Figure 14:
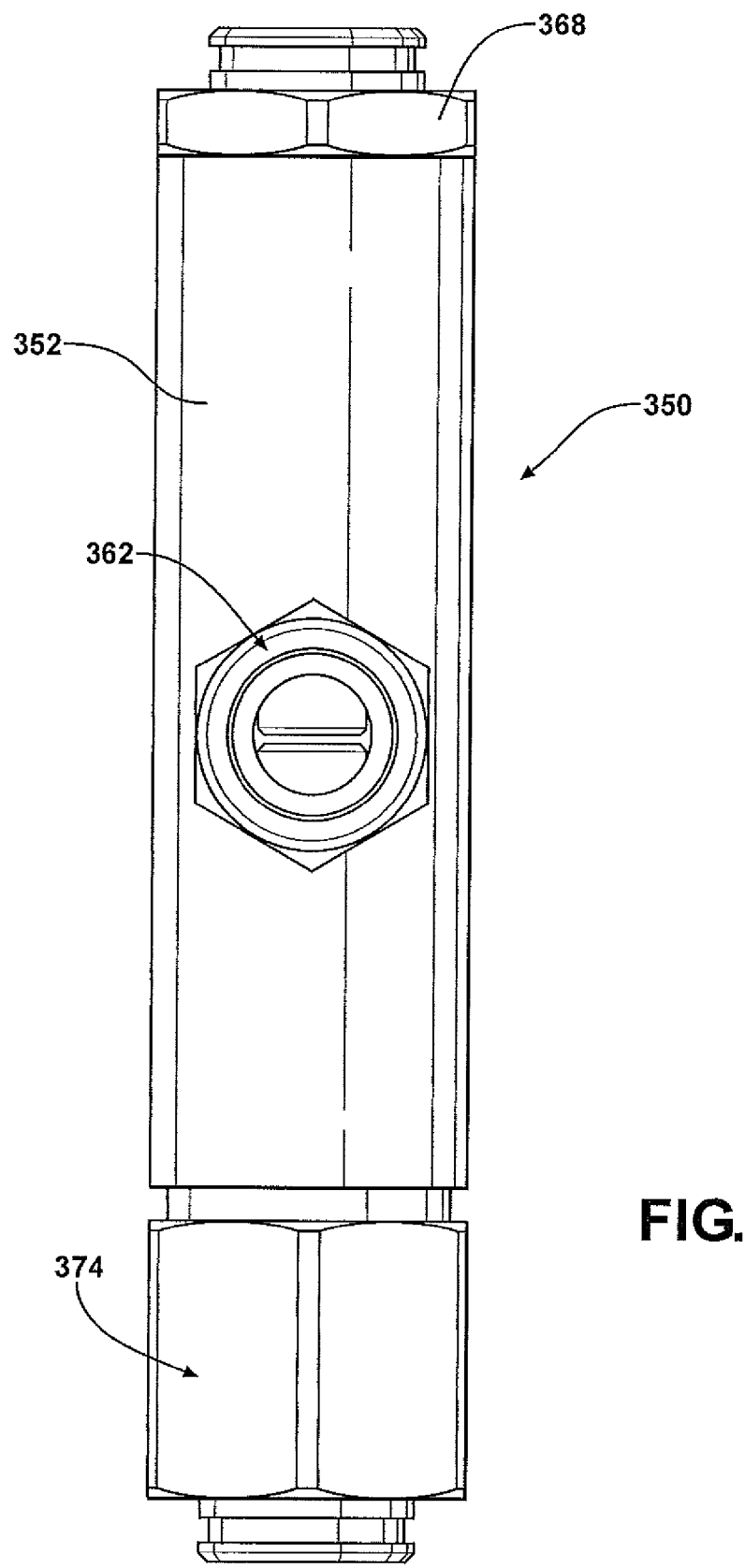
FIG. 14 is a right side elevational view of the thermal relief valve assembly shown in FIG. 12.

A thermal actuator 400 is fixedly mounted in the sleeve 382 by means of a threaded connection, a crimp end connection, and a press fit connection, etc. The thermal actuator 400, which can be a Behr Thermo-tronic model no. 051651 thermal actuator, has an extensible piston 402 which, in a normal retracted position shown in FIG. 12, is spaced from or non forcibly contacts the ball check 390. This enables the biasing spring 396 to maintain the ball check 390 in fixed engagement with the valve seat 388 to block fluid flow through the sleeve 382 when the thermal relief assembly 380 is in the normal state shown in FIG. 12 which corresponds to a cold or low fluid temperature.

Figure 15:
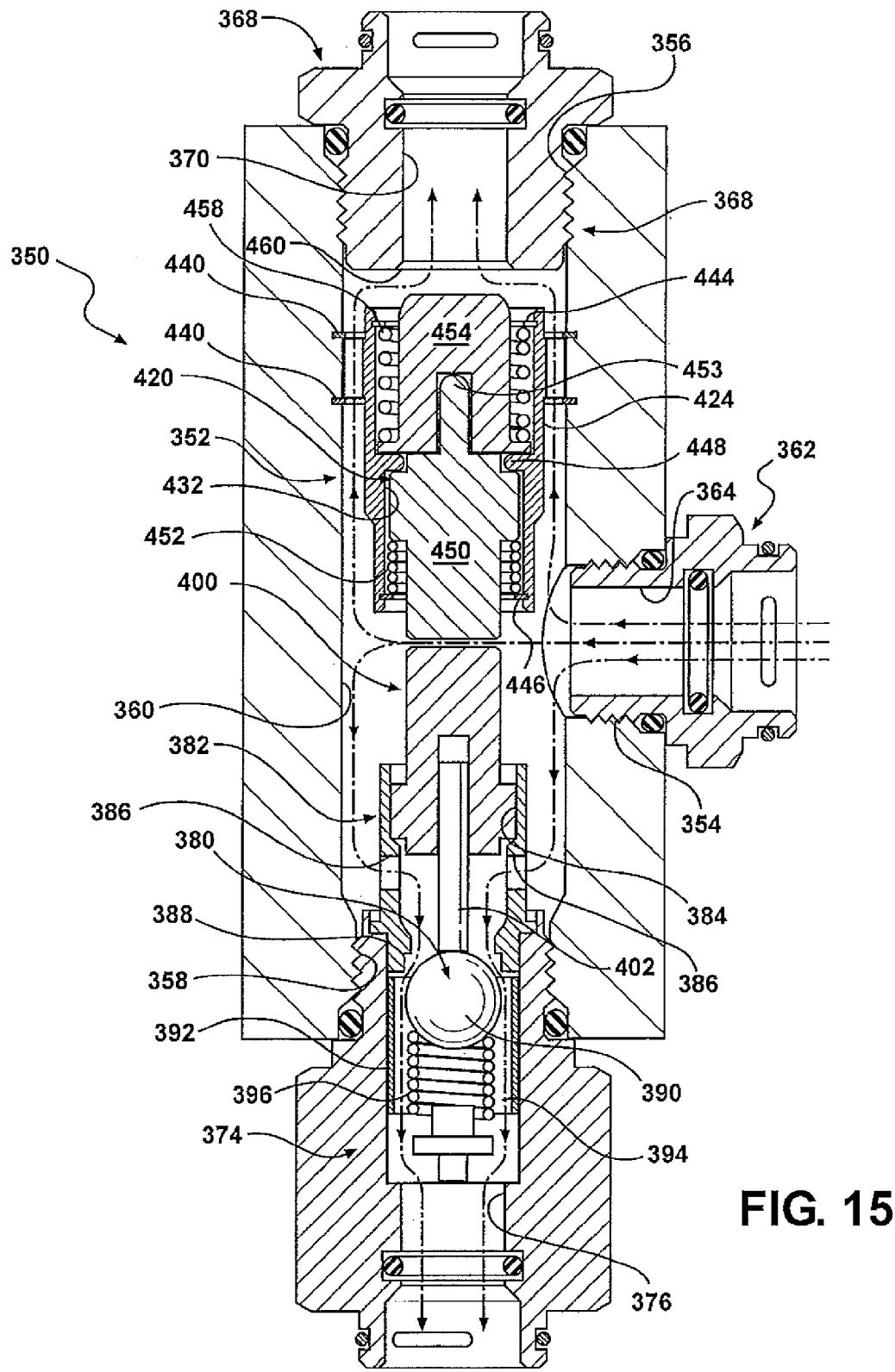
FIG. 15 is a vertical cross section view of the thermal relief valve assembly shown in FIG. 12, but depicted in a second operating state when the fluid is at an intermediate temperature.

When the temperature of the fluid contacting the thermal actuator 400 reaches a first preset temperature, as described hereafter, the thermal actuator 400 extends the piston 402, as shown in FIG. 15, with sufficient force and over a sufficient distance or stroke to overcome the biasing force of the spring 396 and move the ball check 390 away from the valve seat 388. This allows fluid flow through the sleeve 382, the bore 376 and the third quick connection 374 into and through a fluid conduit coupled to the quick connection 374.

A second thermal relief valve assembly 420 is also mounted in the block 352. The second thermal relief valve assembly 420 includes a generally cylindrical housing 424, shown in detail in FIG. 13. The housing 424 has an outer surface or wall 426 extending between the opposed first and second ends 428 and 430, respectively. A through bore 432 extends between the first and second ends 428 and 430.

An engagement means is formed adjacent the first end 428 of the housing 424. The engagement means in the form of a plurality of radially outwardly extending spaced projections 434. The projections 434 are circumferentially spaced apart about the housing 424 to define a plurality of recesses 436 about the periphery of the external wall 426 of the housing 424. A pair of support members 440, shown in FIG. 12, are formed or carried internally within the block 352 and extend inward a short distance beyond the inner diameter of the bore 360. The support members 440 may be integrally formed as part of the block 352 or as separate support members in the form of retainer clips mounted in grooves in the block 352.

With the innermost support member surfaces 440 disposed in the block 352, the housing 424 is inserted into the bore 360 through one end of the block 352 until the housing 424 rests on the support member 440. The end most support member or retainer clip 440 is then mounted in the groove in the block 352 to lock the housing 424 in the block 352.

The housing 424 also includes a pair of radially inward extending retainer clips 444 and 446. Like the support members 440, the retainer clips 444 and 446 may be integrally formed with the housing 424 or mounted in recesses at the opposite ends 428 and 430 of the housing 424. A flange 448 extends radially inward from the inner wall of the housing 424, intermediate the first and second ends 428 and 430. The flange 424 acts as a seat for a thermal actuator 450 which can be identical to the thermal actuator 400. An enlarged shoulder on the actuator 450 engages the flange 448 to define a mounting location for the thermal actuator 450 in the housing 424. A biasing means, such as coil spring 452, may be mounted within the housing 424 between the enlarged shoulder on the thermal actuator 450 and the projection 446 to continually bias the thermal actuator 450 to a forward-most mounting position.

As with the thermal actuator 400, the thermal actuator 450 includes an extensible piston 453 which is shown in FIG. 12 in the normally retracted position at normal lower or cold fluid temperatures. When a second preset fluid temperature, higher than the first preset temperature at which the first thermal actuator 400 activates, is detected by the thermal actuator 450, the thermal actuator 450 extends the piston 452 as described in previous aspects of the cooler bypass apparatus.

A plunger 454 is mounted within the housing 424. The piston 452 of the thermal actuator 450 engages the plunger 454. A biasing means, such as a coil spring 458, is mounted between one of the projections 440 and an enlargement or shoulder on the plunger 454 to normally bias the plunger 454 to the first position shown in FIG. 12. Extension of the piston 453 due to activation of the thermal actuator 450, as described in greater detail hereafter in conjunction with FIG. 16, overcomes the biasing force of the spring 458 and moves the end 456 of the plunger 454 into an engagement with a seat 460 formed at one end of the second quick connection 368 to block fluid flow from the bore 360 in the block 352 through the quick connection 368 and a fluid conduit coupled thereto.

Retraction of the piston 452, as also described hereafter, enables the biasing spring 458 to move the plunger 454 back to the retracted position shown in FIG. 12 re-enabling fluid flow between the bore 360 in the block 352 and the passageway 370 in the quick connection 368.

In operation, it will be assumed that the block 352 is connected in one of the fluid circuits shown in FIGS. 1-9 or in FIGS. 10 and 11 as a replacement for one of the blocks 20 or 264. The fluid conduit 26 extending from the transmission is coupled at one end to the first quick connection 362. The second quick connection 368 is coupled either directly or by an intervening conduit, such as the hose 208 to the tee body 168 which is itself coupled to the outlet 34 of the heat exchanger or radiator 24. The third coupling 372 is coupled by an intervening conduit, such as hose 194, to the inlet 32 of the heat exchanger or radiator or directly to the radiator inlet 32 as shown in FIGS. 10 and 11.

Assuming that the transmission fluid is at ambient temperature, which will be considered to be a "cold" temperature, the thermal relief assemblies 400 and 450 will have the associated pistons 402 and 452 in the positions shown in FIG. 12. At this time, the piston 402 of the thermal actuator 400 is retracted which enables the ball check 390 to be biased by the spring 396 to a position in engagement with the valve seat 388 blocking flow through the sleeve 382 through the outlet connection 374 to the inlet 32 of the radiator or heat exchanger 24. At the same time, the second thermal actuator 450 has the piston 453 in a retracted position due to the cold or low temperature of the transmission fluid when the engine is started for the first time. With the piston 453 retracted, the biasing spring 458 urges the plunger 454 away from the seat 460 in the second connection 368 enabling fluid flow from the transmission through the inlet or first connection 362, the bore 360 in the block 352, the second outlet connection 368 through the tee body 168 back through the conduit 38 to the transmission without any cooling effects from fluid flow through the radiator or heat exchanger 24. This is the warm-up or bypass phase of operation.

When the transmission fluid or oil warms up to the first preset temperature, such a 160° F., for example, the thermal actuator 400 activates causing the piston 402 to extend as seen in FIG. 15. The piston 402 urges the ball check 390 away from the valve seat 388 thereby enabling flow of a portion of the transmission fluid coming through the inlet connection 362 and the bore 360 in the block 352, the passages 386 in the sleeve 382, around the ball check 390 and through the bore 376 and the outlet connection 374 to the heat exchanger 24 where a portion of the transmission fluid flowing from the transmission is cooled before flowing through the tee connection 168 back to the transmission. In this phase of operation, the transmission fluid or oil flows through both outlet connections 368 and 374, with only a portion of the transmission fluid being cooled by the heat exchanger 24. When both the ball check 390 and the plunger 454 are in the opened position, fluid back pressure by the bypass apparatus is lower thereby using incrementally less energy and fuel to operate the vehicle.

Under most conditions, the transmission fluid or oil will continue to rise in temperature unless the vehicle is operated in extreme cold environments or if the vehicle is idling. This is the mixed mode of operation where a typical vehicle operates most of the time.

Figure 16:
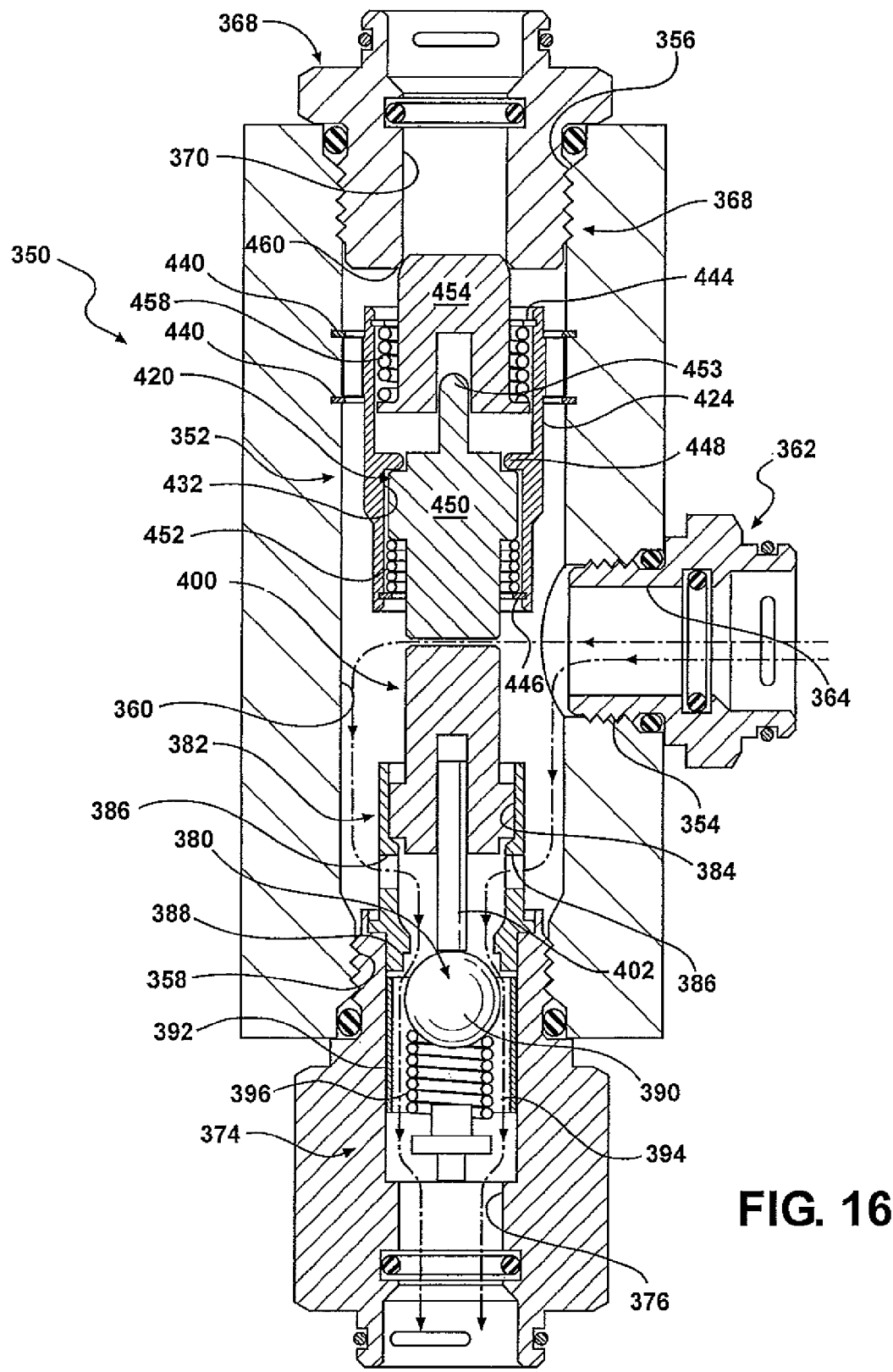
FIG. 16 is s a vertical cross section view of the thermal relief valve assembly shown in FIGS. 12 and 15, but depicted in a third operating condition when the fluid is at a third high or nominal operating temperature.

If and when the transmission fluid or oil reaches the second higher preset temperature, such as 180° F., for example, the second thermal actuator 450 is activated, as seen in FIG. 16, which causes the piston 452 to extend moving the plunger 454 into an engagement with the valve seat 460 in the outlet connection 368. This blocks fluid flow through the outlet connection 368 and closes off the bypass loop of the cooler bypass apparatus 350. The transmission fluid continues to flow through the open ball check 390 such that now all of the transmission fluid flows through the cooling loop of the bypass apparatus 350 into the radiator 24 wherein all of the transmission fluid is subject to cooling to prevent overheating of the transmission fluid. This is the full cooler mode of operation.

When the engine is turned off, fluid flow from the transmission through the bypass apparatus 350 ceases. When the temperature of any transmission fluid remaining in the bore 360 of the block 352 cools below the second higher preset temperature, the thermal actuator 450 will deactivate retracting the piston 453 and enabling the biasing spring 458 to move the plunger 454 away from the seat 460 thereby opening the outlet connection 368 to the bore 360 in the block 352 when the engine is restarted as shown in FIG. 12.

When the temperature of the transmission fluid cools further below the first preset temperature, the thermal actuator 400 will deactivate causing the piston 402 to retract. This enables the biasing spring 396 to move the ball check 390 into engagement with the valve seat 388 blocking any fluid flow through the outlet connection 374. This resets the bypass apparatus to the rest mode of operation shown in FIG. 12.

Under certain vehicle operating conditions, such as when idling, light loads, or in cold climates, it is possible that transmission fluid or oil temperature will never reach the optimum operating temperature. In these operating conditions, it is necessary to add heat to the transmission fluid in order to maintain it at the optimum operating temperature or to more quickly warm up the transmission fluid during initial engine start up.

Figure 19:
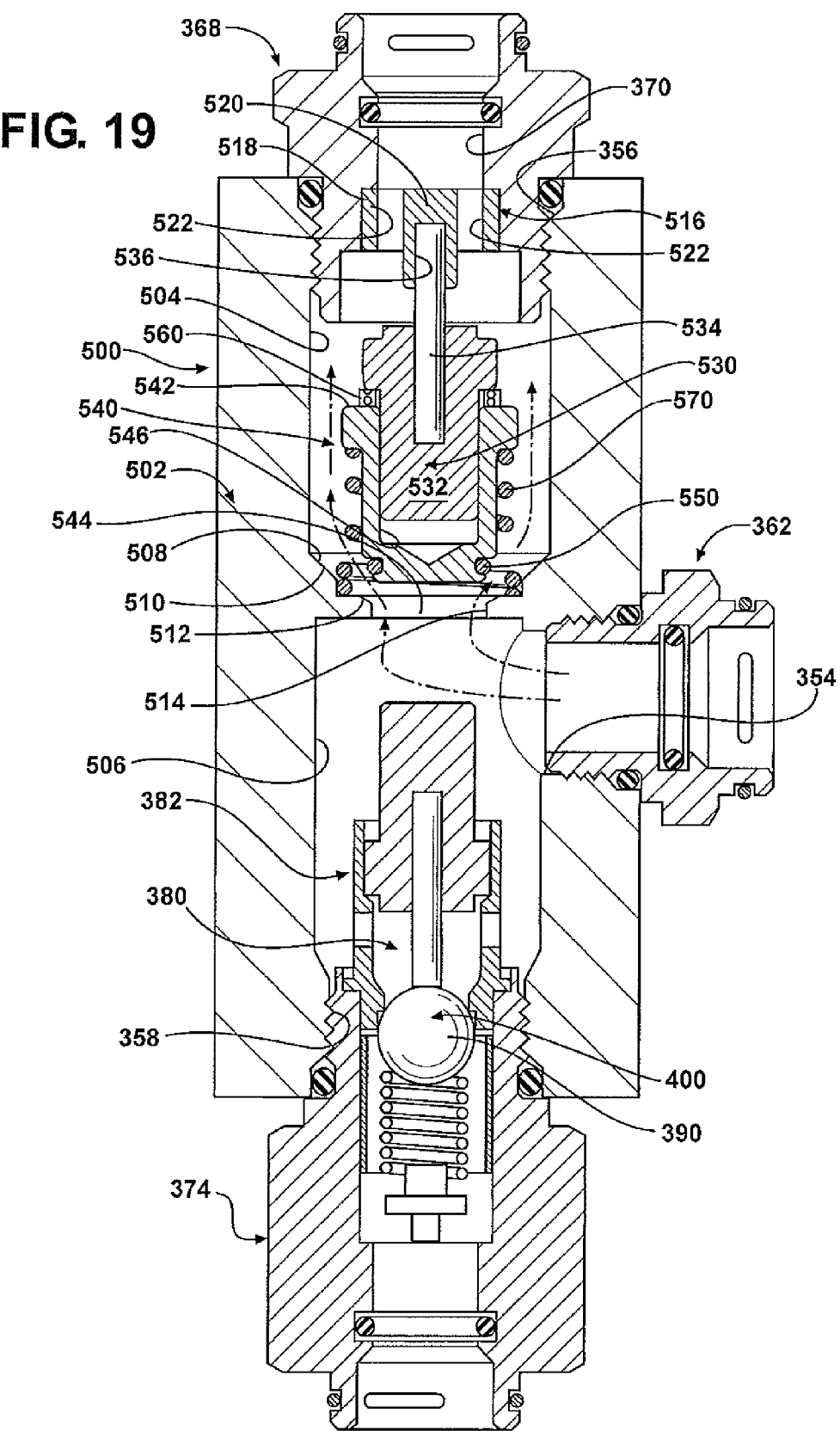
FIG. 19 is a vertical cross section view of another aspect of a cooler bypass apparatus, which is a modification of the cooler bypass apparatus shown in FIG. 12.

Referring now to FIG. 19, there is depicted a modified version of the cooler bypass 350 shown in FIGS. 12-16. In the cooler bypass apparatus 500 shown in FIG. 19, like components from the assembly 350 shown in FIGS. 12-16 are given the same reference numbers for clarity.

The apparatus 500 includes a block 502 with first, second, and third ports 354, 356 and 358 which respectively receive connections or quick connections 362, 368 and 374, respectively.

The apparatus 500 functions in a similar manner as the apparatus 350 described above, but are formed with fewer components and without internal snap rings for easier and less expensive manufacture.

In place of a large single bore 360 in the block 352 shown in FIG. 12, the block 502 includes a first bore portion 504 and a second, generally coaxially aligned, bore portion 506 which are fluidically interconnected to each other and to the third port 354. The second connection 368 is mounted in the second port 356 formed at one end of the first bore portion 504. Similarly, the third connection 374 is mounted in the third port 358 disposed at one end of the second bore portion 506.

The first bore portion 504 extends from the second port 356 at a substantially a constant diameter and transitions through a conical portion 508 to an annular portion defining a shoulder 510. The generally annular shoulder 510 then transitions to a conical surface 512 defining a valve seat as described hereafter. The conical portion 512 is connected to the second bore portion 506 by an annular bore 514.

A guide 516 is operatively coupled to the second connector 368, which can be a quick connector, in a bore formed at one end of the connector 368. The guide 516 may be formed of any suitable material, such as a metal, i.e., aluminum, or maybe made of a die cast metal, or formed of molded plastic.

The guide 516 is in the form of a generally annular body having an outer portion 518, a central portion 520 and a plurality of circumferentially spaced, longitudinally extending bores 522. The bores 522 define flow paths through the guide member 516 between the first bore portion 504 and the internal bore 370 in the connection 368. The outer portion 518 of the body of the guide 516 is press fit or otherwise fixedly mounted in the bore in the connection 368 as shown in FIG. 19.

Alternately, the guide 516 may be formed of a body with a plurality of radially extending spokes coupled between the solid center section 520 and a ring shaped outer portion 518. The circumferentially spaced openings between the spokes define the flow paths through the guide 516.

Further, the entire guide 516 may be integrally formed as a unitary part of the connection 368.

A thermal relief valve assembly 530 is disposed within the first bore portion 504. The thermal relief valve assembly 530 includes a thermal actuator 532, such as a wax motor, having an extensible element or the piston 534 movably extending from one end. The extensible member or piston 534 fits loosely within a bore 536 formed in the solid central portion 520 of the guide 516.

A valve 540 has an enlarged diameter first end 542 and a smaller diameter second end 544. A bore 546 is formed internally within the valve 540 and movably receives thermal actuator 532.

A seal member 550 is mounted in a recess adjacent the second end 544 and sealingly engages the conical valve seat 512 in the body 502 to selectively open and close the cold bypass flow path between the first connection 362 and the second connection 368.

An over-travel biasing means or spring 560 is disposed about the main body of the thermal actuator 532 and seats between an enlarged diameter end of the thermal actuator 532 and the enlarged diameter first end 542 of the valve 540.

The over-travel spring 560 has a higher spring constant or stiffness than a return biasing means or spring 570 which is disposed about the body of the valve 540 between the enlarged first end 542 and the seat 512 formed in the first bore portion 504. The spring constant or stiffness of the return spring 570 is less than the stiffness or spring constant of the over travel 560.

In operation, the springs 560 and 570 in a normal, non engine operating condition where the coolant is at ambient or cold temperature relative to the engine operating temperature, will expand to a relaxed state shown in FIG. 19. The spring 570 moves the valve 540 away from the valve seat 512.

The over-travel spring 560 biases the end portion of the thermal actuator 532 away from the valve 540. In this cold temperature state, the extensible member or piston 534 of the thermal actuator 532 has retracted to its normal position relative to the body of the thermal actuator 532 allowing the entire thermal actuator 532 to move toward the guide 516.

In this position, the cooler bypass apparatus 500 defines an open flow path from the first connection 362 on the body 502 through the first bore portion 504 to and through the second connection 368. This defines the cold bypass flow path of the apparatus 500 which functions similarly to the cold bypass flow path of the apparatus 350 shown in FIG. 12 and described above.

At this cold temperature engine operating temperature state, the thermal actuator 380 will be in a normally closed position blocking flow through the third connection 374 in the same manner as in the bypass valve 350 shown in FIG. 12.

Figure 20:
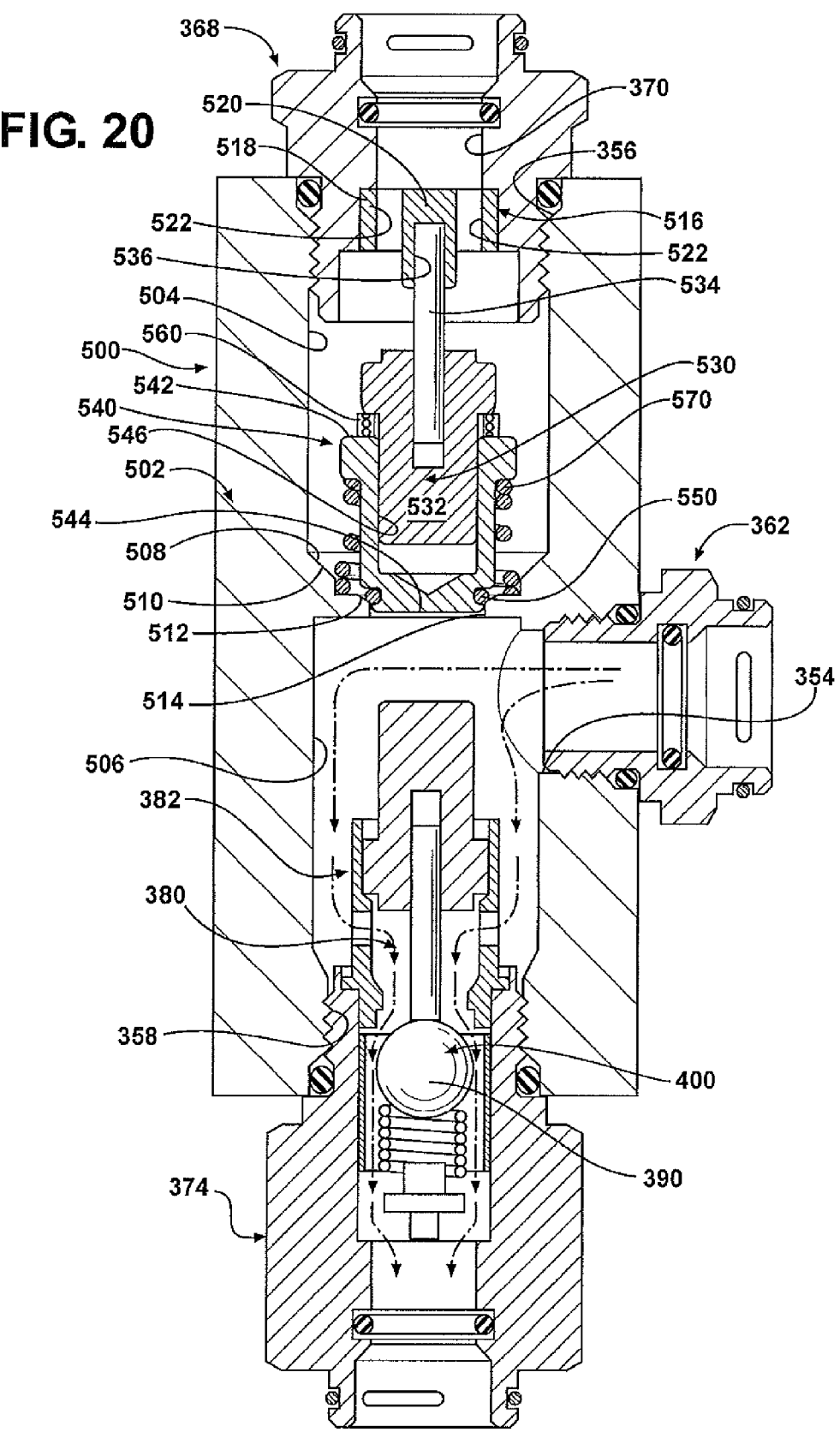
FIG. 20 is a vertical cross section view of the cooler bypass, shown in FIG. 19 in a cooler loop state.

When a higher engine fluid temperature is detected by the thermal actuator 532, the extensible member or piston 534 extends as shown in FIG. 20. This extension pushes the thermal actuator 532 against the valve 540 through the rigid, expanded over-travel spring 560 causing the return spring 570 to compress, allowing movement of the valve 540 and the thermal actuator 532 toward the valve seat 512 until the O-ring 550 sealingly engages the valve seat 512 closing off fluid flow through the bore portion 504.

As further expansion of the extensible member or piston 534 continues, the over travel spring 560 will compress to protect the valve 540 and the valve seat 512 from deformation.

When the engine is turned off, fluid flow from the transmission through the bypass apparatus 500 ceases. When the temperature of any transmission fluid remaining within the block 502 cools below the high preset temperature, the thermal actuator 532 will deactivate, allowing the return spring 570 to move the valve 540 and the thermal actuator body 532 away from the valve seat 512 thereby opening the fluid flow path between the first connection 362 and the second connection 368 in the block 502 and re-opening the bypass path for a subsequent restart of the engine as shown in FIG. 19.

Figure 17:
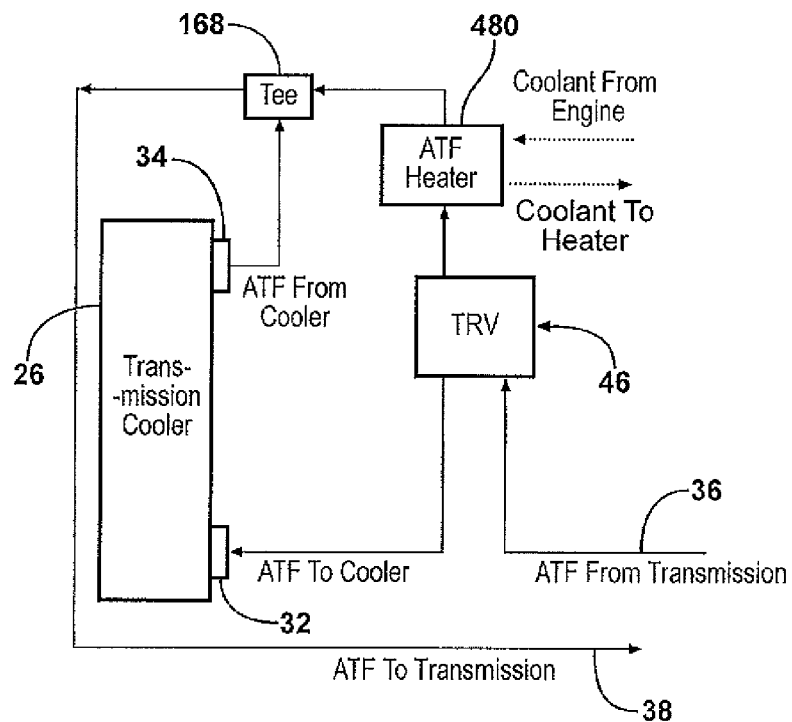
FIG. 17 is a diagram depicting another aspect of the cooler bypass apparatus combined with a separate fluid heater.
Figure 18:
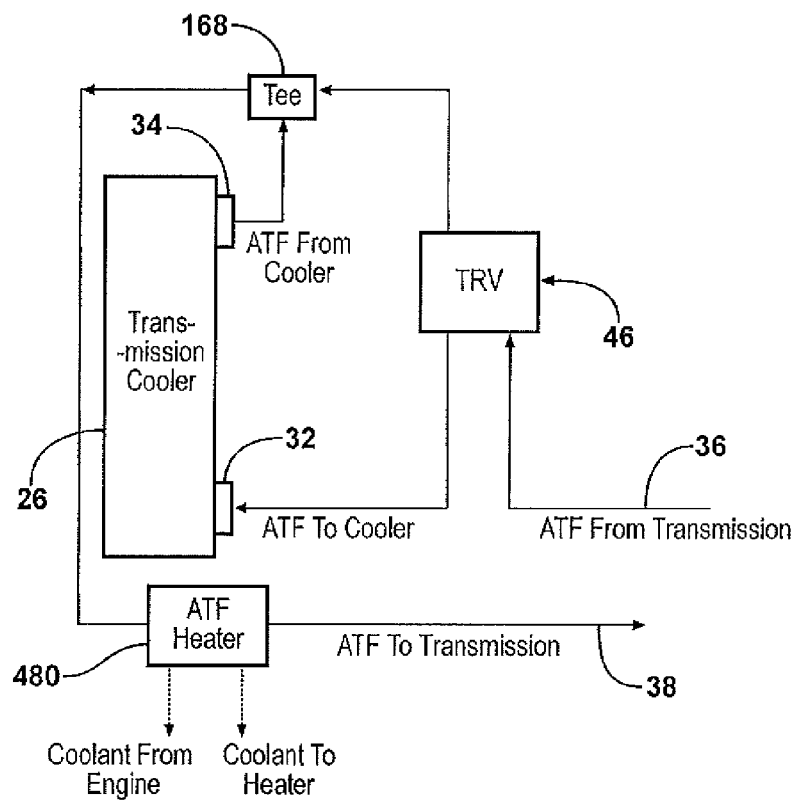
FIG. 18 is a diagram of the cooler bypass apparatus depicted with a separate external heater in a different fluid circuit.

A water to transmission fluid/oil heat exchanger, depicted by reference number 480 in FIGS. 17 and 18, includes an internal array of fins which receive the transmission fluid as described hereafter. Coolant from the engine flows through the heater 480 around the fins to transfer heat to the transmission fluid flowing through the fins.

In the following aspects of the combination of the heater 480 and the various cooler bypass apparatus previously described, it will be understood that the heater 480 can be applied to any of the cooler bypass aspects or configurations described previously or hereafter. Thus, by example only, the heater 480 will be described, by way of example only, as fluidically coupled to the cooler bypass apparatus 20 shown in FIG. 1.

Referring now to FIG. 17, the various components of the cooler bypass apparatus 20 are depicted in pictorial form. The heater 480 receives engine coolant by a fluidic coupling to the hot side of the radiator 24 or, alternately, by a fluidic connection to the coolant flow conduit from the engine block to the radiator 24.

As described above in conjunction with FIGS. 1-9, the flow control block labeled in FIG. 17 as TRV 46 is fluidically coupled to the conduit 36 carrying transmission fluid from the vehicle transmission. One outlet of the TRV 46 is coupled to the inlet 32 of the transmission cooler 26. The outlet 34 of the transmission cooler 26 is coupled to the tee element 168. The outlet of the tee element 168 is coupled to the conduit 38 to return fluid to the transmission.

In the aspect shown in FIG. 17, the heater 480 is fluidically coupled between the first outlet of the TRV 46 and the tee element 168 in the bypass loop of the bypass apparatus 20. In this manner, the heater 480 functions to transfer heat to the transmission fluid only when the TRV 46 is in the bypass mode of operation. As described above, in the bypass mode of operation, the transmission fluid in conduit 36 passes through the TRV 46 directly to the tee element 168 and back to the transmission via conduit 38 bypassing the transmission cooler 26. In this configuration, the heater 480 adds additional heat to the transmission fluid which decreases transmission fluid warm-up to the nominal operating temperature as well as providing additional heat to the transmission fluid in colder climate operation or under various engine operating conditions.

When the transmission fluid heats up to about 180° F., the bypass thermal relief valve assembly 120 opens which causes the ball check 110 to close and directed transmission fluid from the conduit 36 to the TRB 46 and the outlet 120 to the inlet of the transmission cooler 32. Since all of the transmission fluid is now directed by TRV 46 directly to the transmission cooler 26, additional heating from the heater 480 does not take place.

Another aspect of the combined heater and cooler bypass apparatus is shown in FIG. 18. In this aspect, the heater 480 is coupled in the outlet path between the tee element 168 and the conduit 38 which returns fluid to the transmission. This application of the heater 480 maintains the heater 480 in operation at all times during engine operation, including during both bypass mode of operation and during complete cooling mode of operation of the TRV 46.

Figure 21:
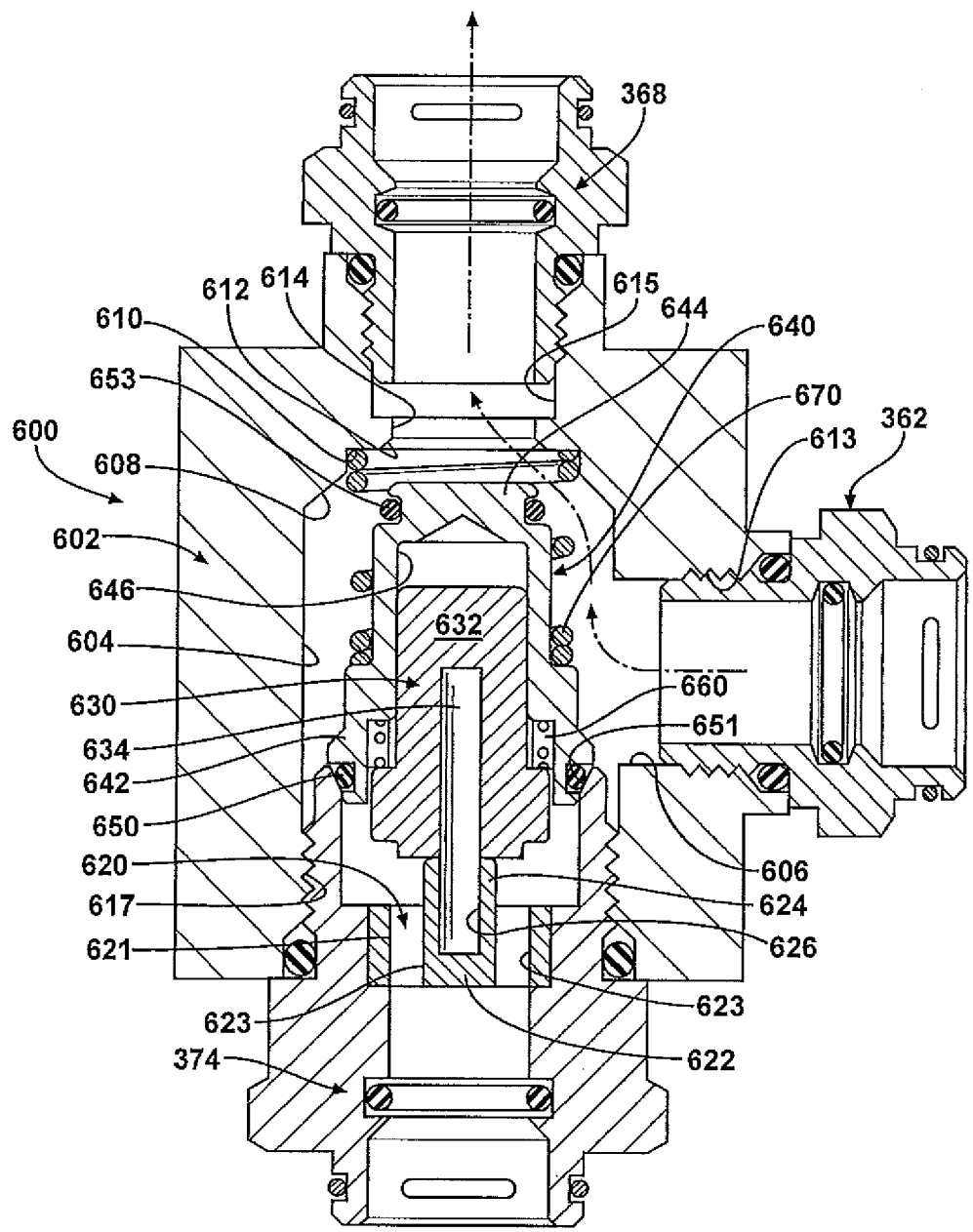
FIG. 21 is a vertical cross section view of another aspect of a cooler bypass apparatus, shown in a bypass flow state.
Figure 22:
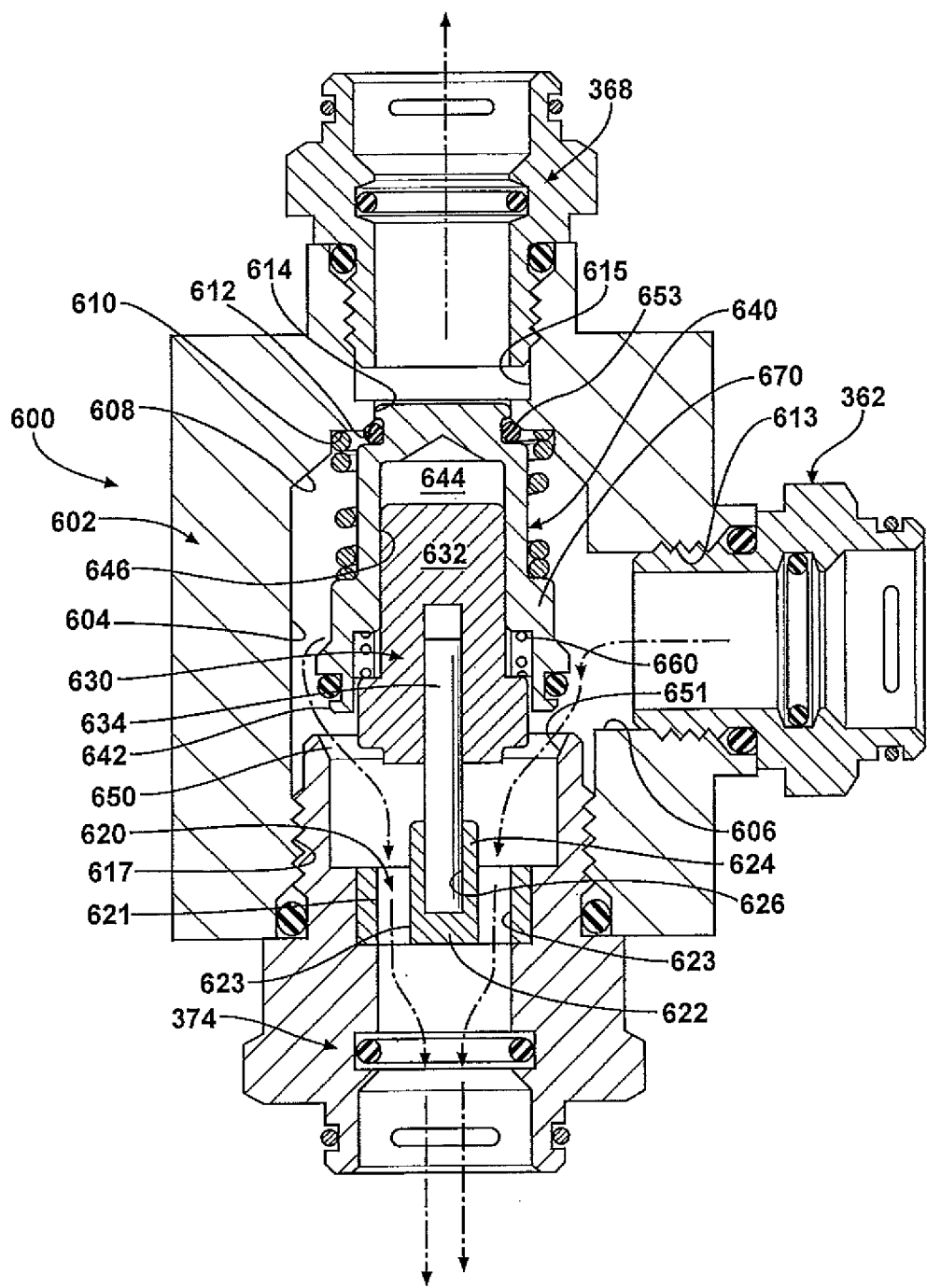
FIG. 22 is a vertical cross section view of the cooler bypass shown in FIG. 21, but depicted in a cooler flow state.

Referring now to FIGS. 21 and 22, there is depicted another aspect of a cooler bypass apparatus 600. The apparatus 600 uses only a single thermal motor for switching fluid flow from the transmission between the bypass loop and the cooler or heat exchanger loop.

The cooler bypass apparatus 600 includes a housing 602 having first, second and third ports 613, 615, and 617 which receive the fittings or quick connections 362, 368 and 374, as described in previous aspects. A bore 604 extends between the second and third ports 615 and 617. A transverse bore 606 extends from the first port 613 and intersects the bore 604.

The first bore 604 transitions at one end through a necked down or conical portion 608 to an annular shoulder 610. A further reduction in diameter through a necked down portions 612 to an annular portion 614 coupled to the second port 615 places the second port 615 in fluid flow communication with bore 604.

A guide 620 is coupled to the second connector 374, in a bore formed at one of the connector 374. The guide 620 may be formed of any suitable material, such as metal, i.e., aluminum, or maybe made of a die cast metal, or formed of a plastic.

The guide 620 is in the form of a general annular body having an outer portion 621, a center portion 622, and a plurality of circumferentially spaced, axially extending bores 623.

The bores 623 define flow paths through the guide member 620 between the first bore 604 and the internal bore extending through the third connections 374. The outer portion 621 of the guide 620 is press fit or otherwise fixedly mounted in the bore in the third connection 374.

Alternately, the guide 620 may be formed of a body with a plurality of radially extending spokes coupled between the solid center portion 622 and a ringed shaped outer portion 621. The circumferentially spaced openings between the spokes define flow paths through the guides 620.

Alternately, the entire guide 620 maybe integrally formed as a unitary part of the third connection 374.

A thermal relief valve assembly 630 is disposed within the first bore 604. The thermal relief valve assembly 630 includes a thermal actuator 632, such as a wax motor, having an extensible element or piston 634 movably extending from one end. The extensible member or piston 634 fits loosely within a bore 626 formed within the solid center portion 622 of the guide 620.

A valve 640 has a first end 642 and an opposed second end 644. A bore 646 is formed internally within the valve 640 and movably receives the thermal actuator 632. A seal member 650 is mounted in a recess adjacent the first end 642 of the valve 640 and sealingly engages a conical valve seat 651 formed in the inner end of the quick connection 374 to selectively open and close the fluid flow path between the bore 604 and third connection 374 which is coupled to the heat exchanger or cooler. Another seal member 653 is mounted in a recess adjacent the second end 644 of the valve 640. The seal 653 is positioned to sealingly engage the valve seat 612 formed in the housing 602 during movement of the valve 640 between first and second positions to respectively open and close the flow path between the bore 604 and the second connection 368 which defines the cooler bypass loop of the apparatus 600.

A return spring 670 is coupled between a shoulder formed intermediate the length of the valve 640 and the shoulder 610 in the housing 602. The return spring 670 is a coil spring configured for normally biasing the valve 640 to the second position in sealing engagement with the valve seat 651 to close the cooler or heat exchanger loop of the apparatus 600.

An over-travel spring 660 which has a spring constant or stiffness greater than the return spring 670 is disposed within a recess in the second end 642 of the valve 640 and is seated between a shoulder formed internally within the valve 640 and a complimentary shoulder formed in the thermal actuator 632. The spring constant or stiffness of the return spring 670 is less than the stiffness or the spring constant of the over-travel spring 660.

In operation, the spring 670, in a normal, non-engine operating condition or cold fluid temperature state where the fluid to be cooled is at ambient or a cold temperature less than a high preset temperature; will expand to relaxed state as shown in FIG. 21. The spring 670 biases the valve 640 away from the second valve seat 612.

The over-travel spring 660 biases the end portion of the thermal actuator 632 away from the valve 640. In this cold temperature state, the extensible member or piston 634 of the thermal actuator 632 is retracted to its normal cold temperature position relative to the thermal actuator 632 allowing the entire thermal actuator 632 to move toward the guide member 620.

In this position shown in FIG. 21, the apparatus 600 defines an open flow path from the first connection 362, through the bore 604 in the body 602, and through the second connections 368, as shown by the flow lines in FIG. 21. This defines the cold bypass flow path of the apparatus 600.

In this cold temperature state the piston 634 of the thermal actuator 632 will be in a normally closed position blocking flow through the third connection 374 to the ceiling connection of the seal 650 with valve seat 660.

When a higher fluid temperature is detected by the thermal actuator 632, the extensible member or piston 634 extends as shown in FIG. 22. This extension pushes the thermal actuator 632 against the valve 640 through the over-travel spring 660 causing the return spring 670 to compress allowing movement of the valve 640 and the thermal actuator 632 toward the valve seat 612 until the O-ring 653 on the second end of the valve 640 engages the valve seat 612 closing off fluid flow through the second connections 368 to the bypass loop.

At the same time, the separation of the seal 650 from the valve seat 651 opens a fluid flow path between the first connection 362 and the third connection 374 to establish a fluid cooling loop through the heat exchanger.

As further expansion of the extensible member or piston 634 continues, the over travel spring 660 will compress to protect the valve 640 and the valve seat 612 from deformation.

When the engine is turned off, fluid flow from the transmission through the bypass apparatus 600 ceases. When the temperature of any fluid remaining within the housing 602 cools below the high preset temperature, the thermal actuator 632 will deactivate and the piston 634 to retract, allowing the return spring 670 to move the valve 640 and the thermal actuator 632 away from the valve seat 612 thereby opening the fluid flow path between the first connection 362 and the second connection 368, reopening the bypass path for a subsequent restart of the engine as shown in FIG. 21.

At the same time, the piston 634 retracts within the thermal actuator 632. This enables the return spring 670 to move the valve 640 back into sealed engagement with the seat 651 closing off fluid flow through the third connection 374 to the cooler or heat exchanger.

The invention claimed is:

1. A bypass valve adapted to be fluidically coupled between a heat exchanger and a device carrying fluid that needs to be cooled, the bypass valve comprising:
a housing having an inlet port and first and second outlet ports in fluid flow communication with a fluid flow passageway in the housing; and first and second valve seats respectively associated with the first and second outlet ports;
a valve body disposed in the fluid flow passageway in the housing to control the flow of the fluid in the fluid flow passageway between the inlet port and each of the first and second outlet ports;
the valve body carrying a first seal sealingly engageable with the first valve seat and a second seal sealingly engageable with the second valve seat;
a return spring acting between the housing and the valve body for normally biasing the valve body to a position wherein the first outlet port is open and the second outlet port is closed to fluid flow; and
a temperature responsive actuator, disposed in the housing, and coupled to the valve body to move the valve body to open and to close the first and second outlet ports to fluid flow from the inlet port in response to the temperature of fluid flowing in the fluid flow passageway in the housing.

2. The bypass valve apparatus of claim 1 comprising:
the temperature actuator is responsive to a thermal actuator mounted in the housing and controlling movement of the valve body between a first position allowing fluid flow between the inlet port and the first outlet port at fluid temperatures below a preset temperature and simultaneously blocking fluid flow between the inlet port and the second outlet port, and a second position blocking fluid flow between the inlet port and the first outlet port at fluid temperatures above the preset temperature and simultaneously allowing fluid flow between the inlet port and the second outlet port.

3. The bypass valve apparatus of claim 2 wherein:
the thermal actuator normally positions the valve body in the first position allowing fluid flow between the inlet port and the first outlet port at fluid temperatures below the preset temperature.

4. The bypass valve of claim 1 further comprising:
an over travel spring disposed between the valve body and the thermal actuator for coupling movement of the thermal actuator to movement of the valve body.

5. The bypass valve apparatus claim 4 further comprising:
a guide member mounted in the housing and carrying apertures defining a portion of the fluid flow passageway through the housing to the second outlet;
the thermal actuator having an extensible piston, the piston fixedly coupled to the guide member.

6. The bypass valve apparatus of claim 1 further comprising:
a quick connector coupled to at least one of the first inlet port and the first and second outlet ports.

7. The bypass valve apparatus of claim 1 further comprising:
a quick connector coupled to at least one of the first and second outlet ports, the quick connector carrying one of the first and second valve seats.

* * * * *